United States Patent
Kataoka et al.

(10) Patent No.: US 9,380,108 B2
(45) Date of Patent: Jun. 28, 2016

(54) COMPUTER SYSTEM

(71) Applicant: Hitachi Solutions, Ltd., Tokyo (JP)

(72) Inventors: Mikio Kataoka, Tokyo (JP); Yuuichi Nakamura, Kawasaki (JP); Mitsuhiro Katsuta, Yokohama (JP); Akihiko Yoshino, Yokohama (JP); Kazuaki Ibori, Fujisawa (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 208 days.

(21) Appl. No.: 14/132,085

(22) Filed: Dec. 18, 2013

(65) Prior Publication Data
US 2014/0201332 A1  Jul. 17, 2014

(30) Foreign Application Priority Data

Jan. 17, 2013 (JP) .................................. 2013-005828

(51) Int. Cl.
 *G06F 15/173* (2006.01)
 *H04L 29/08* (2006.01)
 *G06F 9/50* (2006.01)

(52) U.S. Cl.
 CPC .......... *H04L 67/1008* (2013.01); *G06F 9/5088* (2013.01); *H04L 67/10* (2013.01); *H04L 67/1029* (2013.01); *H04L 67/2861* (2013.01)

(58) Field of Classification Search
 CPC . H04L 63/0227; H04L 67/1029; H04L 67/10; H04L 51/12; G06F 9/505; G06F 9/5088; G06F 11/30
 USPC ......................................... 709/203, 223, 226
 See application file for complete search history.

(56) References Cited

U.S. PATENT DOCUMENTS

| | | | | |
|---|---|---|---|---|
| 7,974,937 B2* | 7/2011 | Baier | ................ | G05B 19/4183 382/294 |
| 8,595,317 B1* | 11/2013 | Harris | ................ | G06F 17/3087 709/213 |
| 9,043,421 B1* | 5/2015 | Coon | ...................... | H04L 51/30 709/200 |
| 2003/0014498 A1* | 1/2003 | Kreidler | ............. | G05B 19/0426 709/217 |
| 2007/0209075 A1* | 9/2007 | Coffman | ................ | H04L 63/14 726/23 |
| 2008/0082653 A1* | 4/2008 | Huang | ............... | G05B 23/0221 709/224 |
| 2010/0064026 A1* | 3/2010 | Brown | ............... | G05B 19/4185 709/217 |
| 2012/0314710 A1 | 12/2012 | Shikano | | |

(Continued)

FOREIGN PATENT DOCUMENTS

| | | |
|---|---|---|
| JP | 2005-38246 A | 2/2005 |
| JP | 2008-52649 A | 3/2008 |

(Continued)

*Primary Examiner* — Phuoc Nguyen
(74) *Attorney, Agent, or Firm* — Baker Botts L.L.P.

(57) ABSTRACT

A data collection server includes a load monitoring unit configured to monitor a load on the computer system, and a management unit configured to, based on a result of the monitoring, determine a content of a transfer process of data executed at one of servers and transmit the determined content of the transfer process of data to the one of the servers. The management unit determines a type of the transfer process applied to the one of the servers, generates a process subject data list indicating a list of data to which the transfer process is applied out of the data transferred to the data collection server based on the determined type of the transfer process, and determines the content of the transfer process applied to the one of the servers based on the determined type of the transfer process and the generated process subject data list.

6 Claims, 15 Drawing Sheets

(56) References Cited

U.S. PATENT DOCUMENTS

2013/0212214 A1\* 8/2013 Lawson ........... G06Q 10/06315
  709/217
2014/0047106 A1\* 2/2014 Leung ..................... H04L 43/08
  709/224

FOREIGN PATENT DOCUMENTS

| JP | 2009-44288 A | 2/2009 |
| JP | 2011-142439 A | 7/2011 |
| WO | 2011/099320 A1 | 8/2011 |

\* cited by examiner

DATA MANAGEMENT TABLE 110

| 301 DATA IDENTIFIER | 302 DATA DISCARD PROPRIETY | 303 PRIORITY | 304 PERMISSIBLE DELAY TIME |
|---|---|---|---|
| A | NOT ACCEPTED | 10 | 2000 |
| B | NOT ACCEPTED | 5 | 500 |
| ⋮ | ⋮ | ⋮ | ⋮ |

FILTER STATUS MANAGEMENT TABLE 111

| DATA IDENTIFIER | FILTER STATUS 402 | |
|---|---|---|
| | 403 FILTER PRESENCE INDICATOR | 404 FILTER CONDITION |
| A | YES | |
| ⋮ | ⋮ | ⋮ |
| ⋮ | ⋮ | ⋮ |

FIG. 5

FILTER CONDITION ENTRY — 404

| FILTER CLASSIFICATION | FILTER THRESHOLD | DATA DISCARD RATE | PERMISSIBLE DELAY TIME |
|---|---|---|---|
| 501 | 502 | 503 | 504 |
| RECEPTION NUMBER | 5 | 0 | 2000 |

FIG. 6

DATA RECEPTION STATUS TABLE — 112

| DATA IDENTIFIER | RECEPTION NUMBER | RECEPTION AMOUNT | PAST RECEPTION NUMBER | PAST RECEPTION AMOUNT |
|---|---|---|---|---|
| 601 | 602 | 603 | 604 | 605 |
| A | 250 | 1000 | 50 | 200 |
| ⋮ | ⋮ | ⋮ | ⋮ | ⋮ |
| ⋮ | ⋮ | ⋮ | ⋮ | ⋮ |

FIG. 7

LOAD MONITORING TABLE — 113

| LOAD ELEMENT | | CURRENT VALUE | THRESHOLD |
|---|---|---|---|
| | | 701 / 702 | 703 |
| NETWORK | BANDWIDTH UTILIZATION AMOUNT | 200 | 300 |
| SERVER | CPU UTILIZATION RATE | 70 | 80 |
| SERVER | NUMBER OF PACKETS RECEIVED | 1200 | 1000 |
| DATABASE | NUMBER OF SESSIONS PROCESSED | 900 | 1000 |
| DATABASE | AMOUNT OF DATA ACCUMULATED | 100 | 500 |

FIG. 8

ALGORITHM SELECTION TABLE — 114

| LOAD ELEMENT | | FILTER CONTROL ALGORITHM |
|---|---|---|
| NETWORK | BANDWIDTH UTILIZATION RATA | DATA AMOUNT REDUCTION |
| SERVER | CPU UTILIZATION RATE | DATA NUMBER DELETION |
| SERVER | NUMBER OF PACKETS RECEIVED | DATA NUMBER AGGREGATION |
| DATABASE | NUMBER OF SESSIONS PROCESSED | DATA NUMBER AGGREGATION |
| DATABASE | AMOUNT OF DATA ACCUMULATED | DATA AMOUNT DELETION |

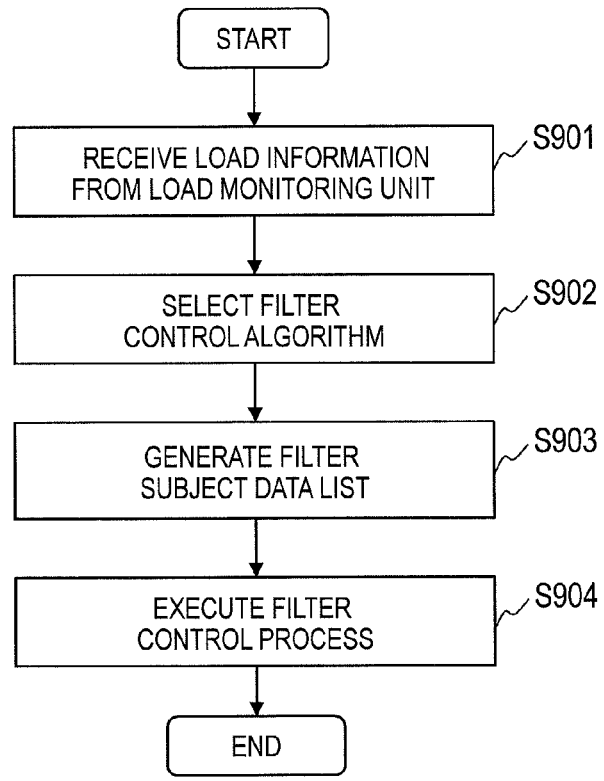

FIG. 13

DATA DISTRIBUTION TABLE (127)

| DATA IDENTIFIER (1301) | DISTRIBUTION DESTINATION (1302) |
|---|---|
| A | BASE FILTER |
| B | BASE FILTER |
| ⋮ | ⋮ |
| D | EXPANSION FILTER A |

FIG. 14

BASE FILTER TABLE (128)

| DATA IDENTIFIER (1401) | FILTER CONDITION (1402) |
|---|---|
| A | |
| B | |
| ⋮ | ⋮ |

COMPUTER SYSTEM

CLAIM OF PRIORITY

The present application claims priority from Japanese patent application JP2013-005828 filed on Jan. 17, 2013, the content of which is hereby incorporated by reference into this application.

BACKGROUND

The present invention relates to a data collection system configured to collect various information transmitted from a plurality of terminals.

In recent years, digitalization of various types of data such as an order for a product, sales data, merchandise information and customer information used in companies is progressing. Further, with the growing popularization and uses of various digital terminals such as sensor devices and smartphones, the volume of data that exists in the world is massively expanding from terabytes to petabyte.

A collection of data that is large and not fully structured is referred to as "big data." It is expected that big data will be collected, analyzed, and utilized by using an advanced technology for use in society and business in the near future.

In the fast changing market environment of recent years, accumulating a large amount of data becomes an issue. In such context, M2M has received attention as a way to collect a large amount of data.

M2M stands for Machine to Machine and is a mechanism which allows a machine to exchange information with another machine reciprocally via a network without a direct human involvement therein. It is expected that it becomes possible to automatically collect a large amount of data efficiently by using M2M.

A conventional data collection system using M2M is a vertically integrated type where data is collected per each type of industry, which is problematic in that the construction cost of such system is unfeasible for some types of industries unless the data to be collected reaches a certain scale. Moreover, since each industry requires its own implementation of such system, one system applicable to one type of industry may not be applicable to other types of industry without major modification to the system.

In the future where a data collection system applicable for a wide variety of industries becomes a necessity, a universal and a horizontally integrated type of system capable of collecting data for multiple types of industries will be required.

Further, it is expected that the amount of data to be collected from a sensor device connected to a data collection system will be vast due to required timeliness in the collection, thus a system capable of efficiently collecting a large amount of data will be required.

WO2011/099320, for example, discloses a technology related to the present invention disclosed herein. WO2011/099320 discloses "in nodes (141-142) disposed between terminal devices (105-110) and a processing server (101), in response to the problem wherein a central portion of a network gets congested when data from a variety of apparatuses, such as sensors or control devices, is passed as is over the network, determinations are made as to whether the nodes will process packets being sent from the terminal devices to the processing server. If it is determined that the nodes will process the packets, it will be possible for the nodes to minimize load on the central portion of the network by carrying out the processing in place of the processing server."

SUMMARY

In order to achieve a horizontally integrated data collection system, it is necessary to solve a problem concerning the collection, at a data collection server, of vast amount of data transmitted via a plurality of sensors.

Since the amount of data transmitted is different for each type of industry, there will be a bias in the amount of data to be collected by a data collection system. However, since it is financially difficult to create a system in accordance with the bias in the amount of data to be collected, namely, the largest possible value for the amount of data, smoothing the amount of data to be collected within a certain amount of time will be required.

In WO2011/099320, as a node processes information received from a terminal device it becomes possible to reduce a workload imposed on a processing server. The technology disclosed in WO2011/099320 is suitable for reducing the amount of data generated from a specific type of industry. Further, since it is possible for a vertically integrated data collection system to anticipate the change in the amount of data which will be transmitted from a terminal device, it is possible to level the amount of data to be collected by executing a smoothing process on data in advance in anticipation of the change in the amount of data.

However, for the horizontally integrated data collection system, which receives data from multiple types of industries, it is exceptionally difficult to anticipate the change in the amount of data to be received thereby. Therefore, it is critical to provide a configuration capable of reducing the workload of a data collection system, particularly a data collection server, in accordance with the change in the amount of data which is transmitted from various sensors.

Issues, configurations, and advantages other than those described above will be apparent from the following description of embodiments.

An aspect of the invention is a computer system including: a plurality of sensors each configured to transmit data of a predetermined data type; a plurality of servers configured to transfer data transmitted from the plurality of sensors; and a data collection server configured to receive the data transferred from the plurality of servers and accumulate the received data. Each of the plurality of servers includes a first processor, a first memory connected to the first processor, and a first network interface connected to the first processor. The data collection server includes a second processor, a second memory connected to the second processor, and a second network interface connected to the second processor. The data collection server includes: a load monitoring unit configured to monitor a load on the computer system; and a management unit configured to, based on a result of the monitoring, determine a content of a transfer process of data executed at one of the plurality of servers and transmit the determined content of the transfer process of data to the one of the plurality of servers. The management unit is configured to: determine a type of the transfer process applied to the one of the plurality of servers; generate a process subject data list indicating a list of data to which the transfer process is applied out of the data transferred to the data collection server based on the determined type of the transfer process; and determine the content of the transfer process applied to the one of the plurality of servers based on the determined type of the transfer process and the generated process subject data list.

According to an aspect of the invention, by dynamically controlling a transmittal process of data carried out with respect to a data collection server in accordance with a workload imposed on a computer system, it is possible to reduce the workload imposed on the data collection server and improve the efficiency of data collection performed by the computer system.

BRIEF DESCRIPTION OF THE DRAWINGS

FIG. 5 is a schematic diagram illustrating an example of a filter condition included at the filter status management table of the embodiment 1 according to the present invention;

FIG. 6 is a schematic diagram illustrating an example of a data reception status table included at the data collection server of the embodiment 1 according to the present invention;

FIG. 7 is a schematic diagram illustrating an example of a load monitoring table included at the data collection server of the embodiment 1 according to the present invention;

FIG. 8 is a schematic diagram illustrating an example of an algorithm selection table included at the data collection server of the embodiment 1 according to the present invention;

FIG. 9 is a schematic flow chart illustrating an example of an algorithm selection process carried out by a filter management unit of the embodiment 1 according to the present invention;

FIG. 13 is a schematic diagram illustrating an example of a data distribution table included at an intermediate server of the embodiment 1 according to the present invention;

FIG. 14 is a schematic diagram illustrating an example of a basic filter table included at the intermediate server of the embodiment 1 according to the present invention;

DETAILED DESCRIPTION OF THE EMBODIMENTS

Figure 1:
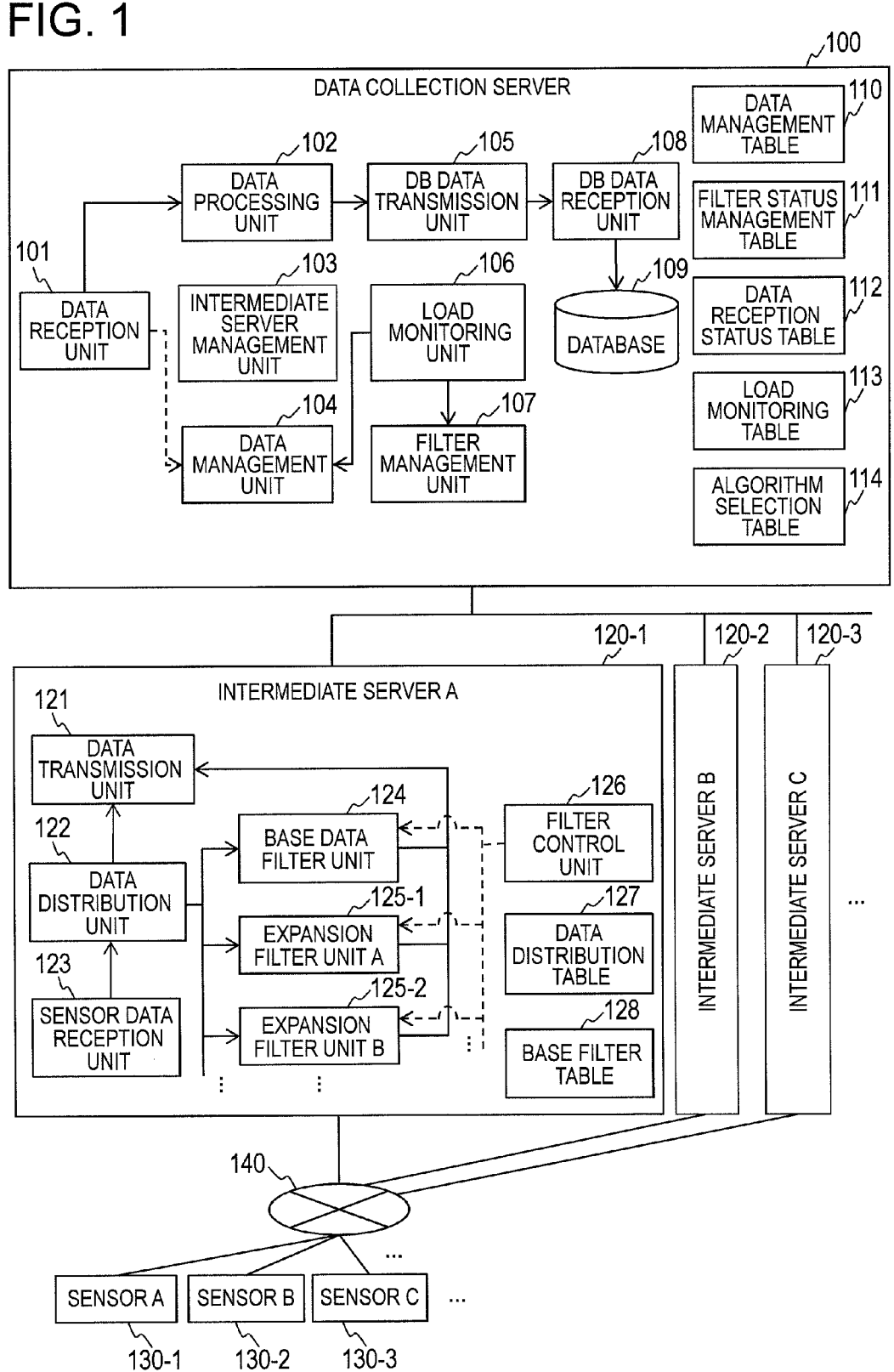
FIG. 1 is a schematic diagram illustrating an example of a configuration of a data collection system of an embodiment 1 according to the present invention.

Hereinafter, embodiments of the present invention will be described with reference to the drawing.

Firstly, a problem concerning a horizontally integrated data collection system will be described.

In general, sensors, which transmit data to a data collection server, are classified into static sensors for which the number of data and/or the amount of data include very small variables irrespective of a time period the data is collected, and dynamic sensors for which the number of data and/or the amount of data collected include variables depending on a time period the data is collected.

The data transmitted from the static sensor is a type of data transmitted at a certain interval such as an amount of electricity used, temperature, and humidity information, or the like. Further the data transmitted from the static sensor have a fixed number of data and a fixed amount of data throughout a course of a single day. On the other hand, the data transmitted from the dynamic sensor is a type of data which accompanies a person or an object such as location information, or the like. Further, the data transmitted from the dynamic sensor varies in a number and an amount of data throughout a course of a single day.

When dealing with data from multiple types of industries, the horizontally integrated data collection system is required to process data for a plurality of types of industries. When it is possible to smooth an amount of data to be processed for a given combination of the plurality of types of industries, the number of data processes or the amount of data processing per a unit of time will be fixed. On the other hand, when it is impossible to smooth an amount of data to be processed for a given combination of the plurality of types of industries, a workload imposed on a data collection server will be increased.

Further, a data collection system including the dynamic sensor is not capable of anticipating the number of data and the amount of data which will be transmitted from the sensor as the number and the amount of data may change.

A data collection system according to the present invention, with configurations and processing described below, is operable to smooth the workload imposed on the data collection server and adjust to dynamic changes in the number of data and the amount of data.

Embodiment 1

The data collection system of an embodiment 1 sets a filter with respect to an intermediate server in a manner accompanying an increase of the amount of data and the number of data transmitted from a sensor, and reduces the workload imposed on the data collection server by reducing the amount of data transmitted to the data collection server. In the description herein, "setting a filter" refers to a process of setting wherein the filter processing is carried out to predetermined data.

FIG. 1 is a schematic diagram illustrating an example of a configuration of the data collection system of the embodiment 1 according to the present invention.

The data collection system according to the present embodiment includes a data collection server 100, a plurality of intermediate servers 120, and a plurality of sensors 130.

The data collection server 100 is connected to the plurality of intermediate servers 120 via a network such as WAN (Wide Area Network) or LAN (Local Area Network), or the like. Note that the data collection server 100 may be connected directly to the plurality of intermediate servers 120. Further, each intermediate server 120 is connected to each sensor 130 via a network 140.

Note that the network 140 may be a cable network such as LAN, PLC, or the like, a wireless network such as WiFi, Zigbee (Registered Trademark), or the like, or a mobile network of a mobile network operator, or the like.

The data collection server 100 is a computer configured to collect data transmitted from the sensor 130, and manage a filter function for each intermediate server 120. Hereinafter, a software configuration of the data collection system 100 will be described.

The data collection server 100 includes, as function blocks, a data reception unit 101, a data processing unit 102, an intermediate server management unit 103, a data management unit 104, a DB data transmission unit 105, a load monitoring unit 106, a filter management unit 107, a DB data reception unit 108, and a database 109. Note that in FIG. 1, a solid line indicates input and output of data between the function blocks, while a dotted line indicates input and output of an instruction.

Further, the data collection server 100 includes for data tables a data management table 110, a filter status management table 111, a data reception status table 112, a load monitoring table 113, and an algorithm selection table 114.

The data reception unit 101 receives data from the intermediate server 120.

The data processing unit 102 converts the received data into data of a predetermined form not reliant on the database 109. For example, the data processing unit 102 executes a process to retrieve a portion of data from the received data, or a process to convert the received data in accordance with a certain method. Note that the data processing unit 102 may execute a conversion process to all received data, or execute a specific conversion process in accordance with a type of received data such as temperature, humidity, power, or the like.

The intermediate server management unit 103 manages a base filter table 128 which is set at the intermediate server 120.

The data management unit 104 manages data transmitted from the sensor 130. To be more specific, the data management unit 104 manages, in accordance with the data management table 110, a setting related to discarding of data for each intermediate server 120, and permissible delay time, or the like, with respect to the data transmitted from the intermediate server 120.

The load monitoring unit 106 monitors a load imposed on the data collection system. According to the present embodiment, the load monitoring unit 106 periodically monitors the load imposed on the data collection system, and reflects the monitoring results to the load monitoring table 113.

The filter management unit 107 makes a determination, in accordance with the load imposed on the data collection system, on a process content (i.e., filter condition) of a filter which is going to be set at the intermediate server 120, and reflects the determined process content (i.e., filter condition) on the intermediate server 120.

The DB data transmission unit 105 transmits data to the database 109. The DB data reception unit 108 stores the data received from the DB data transmission unit 105 at the database 109. Note that although FIG. 1 depicts one DB data transmission unit 105 and one DB data reception unit 108, more than one DB data transmission units 105 and more than one DB data reception units 108 may be arranged. When there are more than one DB data transmission units 105 and more than one DB data reception units 108 are arranged, an appropriate DB data transmission unit 105 and an appropriate DB data reception unit 108 are selected in accordance with a specification of the database 109.

The database 109 stores therein the data transmitted from the sensor 130. The database 109 may include any configuration to accommodate the type of data which will be stored therein.

The data management table 110 stores therein information used for managing the data transmitted from the sensor 130, and is updated by the data management unit 104. The details concerning the data management table 110 will be described below with reference to FIG. 3.

The filter status management table 111 stores therein information used for managing a filter status which is set at each intermediate server 120, and is updated by the intermediate server management unit 103. The details concerning the filter status management table 111 will be described below with reference to FIG. 4 and FIG. 5.

The data reception status table 112 stores therein information related to the data received at the data collection server 100, and is updated by the data management unit 104. The details concerning the data reception status table 112 will be described below with reference to FIG. 6.

The load monitoring table 113 stores therein information used for managing each type of load on the data collection system, and is updated by the load monitoring unit 106. The details concerning the load monitoring table 113 will be described below with reference to FIG. 7.

The algorithm selection table 114 stores therein information related to algorithm applicable for a filter function unit of each intermediate server 120 in order to reduce the load, and is updated by the filter management unit 107. The details concerning the algorithm selection table 114 will be described below with reference to FIG. 8.

The intermediate server 120 is a computer configured to execute a prescribed process with respect to the data transmitted from the sensor 130, and transmit the processed data to the data collection server 100. The software configuration of the intermediate server 120 will be described.

The intermediate server 120 includes, as function blocks, a data transmission unit 121, a data distribution unit 122, a sensor data reception unit 123, a base data filter unit 124, a plurality of expansion filter units 125, and a filter control unit 126.

Further, the intermediate server 120 includes a data distribution table 127 and the base filter table 128 for data tables.

The sensor data reception unit 123 receives data transmitted from the sensor 130. The sensor data reception unit 123 is operable to receive data in accordance with a communication protocol used by the sensor 130. The sensor data reception unit 123 transmits the data received from the sensor 130 to the data distribution unit 122.

The data distribution unit 122 makes a determination as to whether or not the received data is subject to filter processing, and transfers the received data to the filter function unit corresponding to the received data when the received data is subject to filter processing. Further, the data distribution unit 122 transfers the received data to the data transmission unit 121 when the received data is not subject to filter processing.

The data transmission unit 121 transmits the data received from the sensor 130 to the data collection server 100. Note that HTTP, or the like, is used for a transmission protocol used by the data transmission unit 121. Further, the data transmission unit 121 may implement its own protocol and transfer the received data to the data collection server 100 using such protocol.

Next, the filter function unit will be described. The intermediate server 120 includes as the filter function unit thereof the base data filter unit 124 and the expansion filter unit 125.

The base data filter unit 124 executes general filter processing. To be more specific, the base data filter unit 124 stores therein the data, which meets a predetermined condition, in accordance with the number of receptions and the amount of received data per data type, and then transmits the stored data collectively to the data collection server 100 via the data transmission unit 121.

Note that the base data filter unit 124 may also accumulate data for a predetermined period of time with a use of a timer, and then collectively transmit the data accumulated for a predetermined period of time. Further, when transmitting data collectively, the base data filter unit 124 may discard a portion of the accumulated data prior to transmitting the remaining data.

The expansion filter unit 125 is a filter function unit which is used when a data process different from one that is carried out by the base data filter unit 124 is needed. The expansion filter unit 125 executes a following process, for example.

The expansion filter unit 125 receives a plurality of sets of numerical data, calculates an average value of the plurality of sets of numerical data, and transmits the calculated average value as data to the data collection server 100. Further, in order to speed up the process carried out by the data collection server 100, the expansion filter unit 125 executes a pretreatment to the received data and transmits the processed data to the data collection server 100.

It is to be noted that the present invention is not limited to the processes carried out by the base data filter unit 124 and the expansion filter unit 125.

The filter control unit 126 is configured to control the setting of a filter at the intermediate server 120. To be more specific, the filter control unit 126 modifies the setting of a filter condition with respect to the base data filter unit 124, or the like, in accordance with an instruction from the data collection server 100.

The data distribution table 127 stores therein information used for distributing the data received from the sensor 130 to each filter function unit. The data distribution unit 122 uses the data distribution table 127 for reference.

The base filter table 128 stores therein information related to a filter condition, or the like, used for filter processing carried out by the base data filter unit 124. The base data filter unit 124 uses the base filter table 128 for reference.

The sensor 130 is a terminal configured to transmit various types of data to the data collection server 100. The sensor 130 includes a processor, a memory, and a network interface, for example.

<Hardware Configuration of Server>

Figures 2, 3, 4:
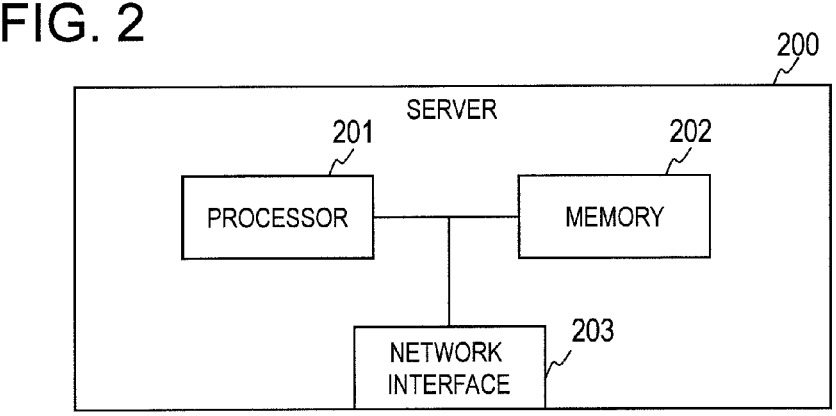
FIG. 2 is a schematic block diagram illustrating a hardware configuration of a server of the embodiment 1 according to the present invention.
FIG. 3 is a schematic diagram illustrating an example of a data management table included at a data collection server of the embodiment 1 according to the present invention.
FIG. 4 is a schematic diagram illustrating an example of a filter status management table included at the data collection server of the embodiment 1 according to the present invention.

FIG. 2 is a schematic block diagram illustrating a hardware configuration of a server of the embodiment 1 according to the present invention. FIG. 2 depicts a hardware configuration of the data collection server 100 and a hardware configuration of the intermediate server 120.

The server 200 includes a processor 201, a memory 202, and a network interface 203.

The processor 201 executes a program stored in the memory 202. When the processor 201 executes the program stored in the memory 202, a function of the data collection server 100 and/or a function of the intermediate server 120 are executed.

The network interface 203 is connected to other devices via a network.

The memory 202 stores therein information necessary for the program and the execution of the program carried out by the processor 201.

The memory 202 of the data collection server 100 stores therein a program for executing the data reception unit 101, the data processing unit 102, the intermediate server management unit 103, the data management unit 104, the DB data transmission unit 105, the load monitoring unit 106, the filter management unit 107, and the DB data reception unit 108. Further, the memory 202 of the data collection server 100 stores therein the data management table 110, the filter status management table 111, the data reception status table 112, the load monitoring table 113, and the algorithm selection table 114.

The memory 202 of the intermediate server 120 stores therein a program for executing the data transmission unit 121, the data distribution unit 122, the sensor data reception unit 123, the base data filter unit 124, the plurality of expansion filter units 125, and the filter control unit 126. Further, the memory 202 of the intermediate server 120 stores therein the data distribution table 127 and the base filter table 128.

<Description of Data Collection Server>

Firstly, the tables included at the data collection server 100 will be described with reference to FIG. 3 to FIG. 8.

FIG. 3 is a schematic diagram illustrating an example of the data management table 110 included at the data collection server 100 of the embodiment 1 according to the present invention.

The data management table 110 includes fields of a data identifier 301, a data discard propriety 302, a priority 303, and permissible delay time 304.

The data identifier 301 is a field for storing therein an identifier used to identify the data transmitted from the sensor 130. The data identifier may include, for example, a character string pre-assigned to each sensor 130, a character string pre-assigned to each type of sensor 130, a character string indicating an URI to which data is transmitted, or a portion of the character string indicating an URI to which data is transmitted, or the like.

The data discard propriety 302 is a field for storing therein the information indicating whether or not received data is permitted to be discarded at the intermediate server 120. The data discard propriety 302 may include a character string such as YES/NO, accepted/not accepted, or TRUE/FALSE; or binary information such as a numerical value (i.e., 1 or 0) as the information stored therein.

The priority 303 is a field for storing therein the information indicating the importance of the data transmitted from the sensor 130. The priority 303 stores therein a numerical value, or the like. The priority 303 is used, for example, when determining a sequence via which it is determined whether or not filter processing is carried out with respect to the data transmitted from the sensor 130.

According to the present embodiment, the higher the priority of the data, the smaller the value is stored therefor at the priority 303. For example, for the data having the highest importance, "1" will be stored at the priority 303.

The permissible delay time 304 is a field for storing therein a permissible queuing time for the received data at the intermediate server 120. The permissible delay time 304 stores therein a numerical value such as "200 millisecond", or the like. The permissible delay time 304 is used when the data, which is a subject to filter processing, requires a real time property in filter processing where the received data is temporarily accumulated at the intermediate server 120 and then transmitted collectively. To be more specific, the intermediate server 120 transmits data to the data collection server 100 when the numerical value included at the permissible delay time 304 is exceeded even if a filter condition is yet to be met.

FIG. 4 is a schematic diagram illustrating an example of the filter status management table 111 included at the data collection server 100 of the embodiment 1 according to the present invention. FIG. 5 is a schematic diagram illustrating an example of a filter condition 404 included at the filter status management table 111 of the embodiment 1 according to the present invention.

The filter status management table 111 includes fields of a data identifier 401 and a filter status 402.

The data identifier 401 is a field for storing therein an identifier used to identify the data transmitted from the sensor 130, and is the same as the data identifier 301.

The filter status 402 is a field for storing therein information indicating a setting status of a filter with respect to the data transmitted from the sensor 130. The filter status 402 includes two fields; a filter presence indicator 403 and a filter condition 404.

The filter presence indicator 403 is a field for storing therein information indicating whether or not a filter is set with respect to the data transmitted from the sensor 130. The filter presence indicator 403 may include a character string such as YES/NO, accepted/not accepted, or TRUE/FALSE; or binary information such as a numerical value (i.e., 1 or 0) as the information stored therein. When there is a filter set with respect to the received data, a character string such as YES, accepted, or TRUE, or the like, will be stored at the filter presence indicator 403.

The filter condition 404 is a field for storing therein a process content of a filter which is set with respect to the data transmitted from the sensor 130 when a filter is set with respect to the data. Hereinafter, the details concerning the filter condition 404 will be described with reference to FIG. 5.

The filter condition 404 includes fields of a filter classification 501, a filter threshold 502, a data discard rate 503, and a permissible delay time 504.

The filter classification 501 is a field for storing therein a value used during filter processing. The filter classification 501 may include an identifier, which indicates a classification such as the number of data, or the amount of data, for example, as a value stored therein.

The filter threshold 502 is a field for storing therein a threshold for filter processing.

For example, when the filter classification 501 includes "the number of data", following filter processing will be carried out. When the data of an identifier matching the data identifier 401 is accumulated as many as the number of values of the filter threshold 502, the intermediate server 120 transmits the accumulated data to the data collection server 100.

Further, when the filter classification 501 includes "the amount of data", following filter processing will be carried out. When the data of an identifier matching the data identifier 401 is accumulated as much as the amount of data of the value of the filter threshold 502, the intermediate server 120 transmits the accumulated data to the data collection server 100.

The data discard rate 503 is a field for storing therein a numerical value indicating a rate of data, which meets a filter condition, and is actually transmitted to the data collection server 100 out of the accumulated data.

The permissible delay time 504 is a field for storing therein an accumulatable permissible time at the intermediate server 120 when the data transmitted from the sensor 130 is accumulated. The permissible delay time 504 stores therein a value equal to or smaller than a numerical value stored at the permissible delay time 304. The intermediate server 120 is operable to accumulate data in accordance with the permissible delay time 504, and execute filter processing of collectively transmitting the accumulated data to the data collection server 100 at a predetermined cycle.

It is to be noted that the filter condition 404 described above is one example and that the present invention is not limited to the filter condition 404.

FIG. 6 is a schematic diagram illustrating an example of the data reception status table 112 included at the data collection server 100 of the embodiment 1 according to the present invention.

The data reception status table 112 includes fields of a data identifier 601, a reception number 602, a reception amount 603, a past reception number 604, and a past reception amount 606.

The data identifier 601 is a field for storing therein an identifier used to identify the data transmitted from the sensor 130, and is identical to the data identifier 301.

The reception number 602 is a field for storing therein the number of data received in a time period between a current point in time and a certain point in the past. The current point in time refers to the latest time stamp out of the time stamps of received data. Further, it is to be noted that a time interval between the current point in time and the certain point in the past is prefixed. For example, in a case where the latest time stamp is from "2012/12/01 12:00:00" and the prefixed time interval is one minute, the reception number 602 will store therein the number of data received between "2012/12/01 11:59:00" and "2012/12/01 11:59:59".

The reception amount 603 is a field for storing therein the amount of data of the data received within a time interval between a current point in time and a certain point in the past.

The past reception number 604 is a field for storing therein the number of data received within a certain time interval up until a current point in time. For example, in a case where the certain time interval is one minute, the past reception number 604 will store therein an average number of data per one minute calculated based on the statistical processing of the number of data received in the past.

The past reception amount 605 is a field for storing therein the amount of data of the data received within a certain time interval up until a current point in time.

As described above, the reception number 602 and the reception amount 603 each indicate the reception status of the present, while the past reception number 604 and the past reception amount 605 each indicate the reception status of the past. Thus, the data reception status table 112 is used when searching for data where the number of data or the amount of data is increased suddenly. Further, the data reception status table 112 is used when a filter is set with respect to data in a descending order of a greatest increase of the number of data or the amount of data.

It is to be noted that the data reception status table 112 depicted in FIG. 6 is one example thereof and may include information other than what is described above. For example, the data reception status table 112 may include a combination of a largest value for the number of data received up until the current point in time and a time of such reception, or a largest value for the amount of data received up until the current point in time and a time of such reception.

FIG. 7 is a schematic diagram illustrating an example of the load monitoring table 113 included at the data collection server 100 of the embodiment 1 according to the present invention.

The load monitoring table 113 includes fields of a load element 701, a current value 702, and threshold 703.

The load element 701 is a field for storing therein an element affecting the performance of the data collection system. According to the present embodiment, the load element includes a bandwidth utilization amount of a network connecting the data collection server 100 and the intermediate server 120, a CPU utilization rate of the data collection server 100, the number of packets received at the data collection server 100, the number of sessions processed at the database 109, and the amount of data accumulated at the database 109, or the like.

The current value 702 is a field for storing therein a value corresponding to the load element 701 at the current data collection system. The value stored at the current value 702 is periodically updated by the load monitoring unit 106.

The threshold 703 is a field arranged to store therein a threshold which is set at the load element 701 at the data collection system.

The threshold 703 is used as a trigger to execute a process such as setting a filter at the intermediate server 120 when a value of the current value 702 becomes greater than a value of the threshold 703.

FIG. 8 is a schematic diagram illustrating an example of the algorithm selection table 114 included at the data collection server 100 of the embodiment 1 according to the present invention.

The algorithm selection table 114 includes fields of a load element 801 and a filter control algorithm 802.

The load element 801 is a field for storing therein an element affecting the performance of the data collection system, and is identical to the load element 701.

The filter control algorithm 802 is a filed for storing therein algorithm identification information applied with respect to each load element 801. Note that the algorithm refers to a filter processing algorithm, which is used to reduce the load imposed on the data collection system, and indicates a type of filter which will be set.

According to FIG. 8, data amount reduction, data number reduction, and data number aggregation are shown as an example of the algorithm.

The data amount reduction algorithm is an algorithm configured to set a filter in order to reduce the amount of data of the data transmitted from the intermediate server 120.

The data number reduction algorithm is an algorithm configured to set a filter in order to reduce the number of data transmitted from the intermediate server 120.

Further, the data aggregation algorithm is an algorithm used to set a filter in order to transmit an aggregated data, which is generated by aggregating multiple data, to the data collection server 100. The data aggregation algorithm is used to set a filter so as to reduce the number of data transmitted from the intermediate server 120.

It is to be noted that the present invention is not limited to the algorithm used herein. For example, an algorithm for transmitting an aggregated data to the data collection server 100 may be used wherein the data to be transmitted from the intermediate server 120 is compressed in order to reduce the amount of data of the data transmitted from the intermediate server 120.

Next, a process carried out by the data collection server 100 will be described with reference to FIG. 9 to FIG. 12.

FIG. 9 is a schematic flow chart illustrating an example of the algorithm selection process carried out by the filter management unit 107 of the embodiment 1 according to the present invention.

The algorithm selection process is carried out when a load imposed on the data collection system is increased as the load monitoring unit 106 periodically monitors the data collection system. To be more specific, the load monitoring unit 106 determines that the load imposed on the data collection system is increased when a value of the current value 702 of the predetermined load element 701 at the load monitoring table 113 becomes greater than a value of the threshold 703, and invokes the filter management unit 107. At this point, the load monitoring unit 106 transmits load information, which includes the corresponding load element 701, to the filter management unit 107.

Firstly, the filter management unit 107 receives the load information from the load monitoring unit 106 (Step S901).

The filter management unit 107 selects, based on the load information and the algorithm selection table 114, a filter control algorithm suitable for the data transmitted from the sensor 130 (Step S902). To be more specific, a following process is carried out.

The filter management unit 107 acquires the load element 701 from the load information. The filter management unit 107 refers to the algorithm selection table 114, and searches for an entry where the load element 801 matches the acquired load element 701. The filter management unit 107 selects the filter control algorithm 802 at the entry, which was searched, as a filter control algorithm applicable for the data transmitted from the sensor 130.

Next, the filter management unit 107 generates a filter target data list corresponding to the selected filter control algorithm (Step S903). Note that a following may be included in a method to generate the filter target data list.

The method to generate the filter target data list may include that when the selected filter control algorithm is either an algorithm for reducing the number of data, or an algorithm for reducing the amount of data, the filter management unit 107 refers to the data discard propriety 302 of the data management table 110, extracts entries of data, which is permitted to be discarded, and creates a list of the extracted entries. For such method, the filter management unit 107 may sort the entries within the filter target data list based on the priority 303 and/or the permissible delay time 304.

By such method, filter processing will be carried out with respect to the data belonging to a type of data which can be discarded. That is, the data belonging to said type of data will be discarded.

The method to generate the filter target data list may include when the selected filter control algorithm is an algorithm for aggregating the number of data, the filter management unit 107 refers to the reception number 602 and the past reception number 604 of the data reception status table 112, extracts entries from the data reception status table 112 in a descending order of a greatest increase of the number of received data, and creates the list of the extracted entries. For such method, the filter management unit 107 may sort the entries within the filter target data list based on the priority 303 and/or the permissible delay time 304.

According to such method in which a process is carried out to an entry at the top of the filter processing data list first, the data belonging to a type of data in which the number of received data is suddenly increased will be subject to the filter processing in a preferential manner. That is, the data belonging to said type of data will be the first to be aggregated.

Further, the filter management unit 107 may extract entries from the data reception status table 112 in a descending order of a largest value of the priority 303 (i.e., in an ascending order of importance), and create the list of the extracted entries. Further, the filter management unit 107 may extract entries from the data reception status table 112 in a descending order of the permissible delay time 304, and add the extracted entries to the list.

According to such method in which a process is carried out to an entry at the top of the filter process data list first, the data belonging to a type of data with the lowest priority will be subject to the filter processing in a preferential manner. For example, the data belonging to a type of data with the lowest priority will be the first to be discarded, whereby aggregation of the data will be facilitated.

Next, the filter management unit 107 executes a filter control process based on the generated filter target data list and the selected filter control algorithm (Step S904). That is, a filter corresponding to the filter control algorithm is set with respect to the data included in the filter target data list. The filter control process will be described below with reference to FIG. 10 to FIG. 12.

As described above, according to the present invention, it is possible to dynamically set a filter with respect to the data transmitted from the sensor 130 in accordance with the load imposed on the data collection system. Accordingly, it is possible to appropriately reduce the load imposed on the data collection system.

Further, since the data used for setting a filter is specified in accordance with the load imposed on the data collection system, it is possible to reduce the load imposed on the data collection system while ensuring the safety and the reliability, or the like, of the data transmitted from the sensor 130.

Figure 10:
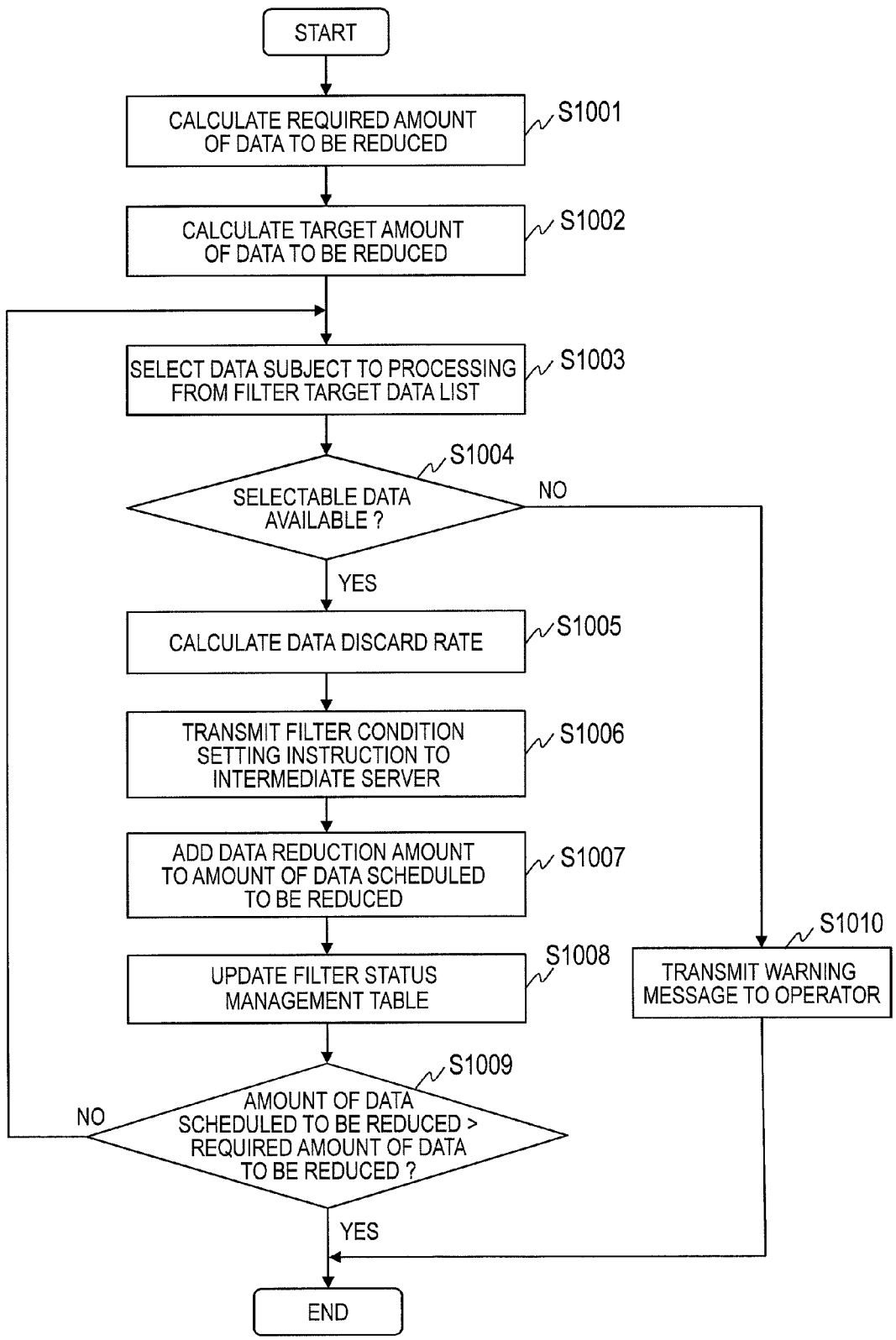
FIG. 10 is a schematic flow chart illustrating an example of a filter control process carried out in accordance with an algorithm of data amount reduction by the filter management unit of the embodiment 1 according to the present invention.

FIG. 10 is a schematic flow chart illustrating an example of the filter control process carried out in accordance with an algorithm of data amount reduction by the filter management unit 107 of the embodiment 1 according to the present invention.

The filter management unit 107 refers to the load monitoring table 113, and calculates the amount of data to be reduced at the data collection system (Step S1001).

To be more specific, the filter management unit 107 calculates the difference between the current value 702 and the threshold 703. For example, when a bandwidth utilization amount of a network is the load element, the threshold 703 is subtracted from the current value 702 of an entry corresponding to the bandwidth utilization amount of the network of the load monitoring table 113 in order to calculate the amount of data to be reduced from the data collection system.

In the description herein, the value calculated from Step S1001 will also be referred to as a required amount of data to be reduced.

The filter management unit 107 calculates an amount of data targeted for reduction per data based on the required amount of data to be reduced and the filter target data list (Step S1002). At this point, the filter management unit 107 initializes an amount of data scheduled for reduction to "0".

Note that a method to determine the amount of data targeted for reduction may include a following method. As one of such methods, the filter management unit 107 divides the calculated required amount of data to be reduced by the number of types of data (i.e., number of entries) included in the filter target data list in order to calculate the amount of data targeted for reduction. Further, as another such method, the filter management unit 107 multiplies a value, which is obtained by dividing the calculated required amount of data to be reduced by the number of types of data (i.e., number of entries) included in the filter target data list, by a constant in order to calculate the amount of data targeted for reduction.

By virtue of the above mentioned determination method, it becomes possible to execute a filter control where the amount of data of each data type is reduced equally. Further, the amount of data targeted for reduction may be determined based on the priority of each data type. For example, the filter management unit 107 calculates a ratio of the data to be reduced per each data type based on the value of the priority 303, and calculates the amount of data targeted for reduction based on the calculated ratio and the required amount of data to be reduced. For example, a reciprocal number of the value of the priority 303 may be used as the ratio of the data to be reduced.

Next, the filter management unit 107 selects data which is subject to processing from the filter target data list (Step S1003).

Note that a method to select data which is subject to processing may include a following method. As one of such methods, the filter management unit 107 refers to the priority 303 of the data management table 110 in order to select data included in the filter target data list in an ascending order of the value for the priority 303. Further, as another such method, the filter management unit 107 may calculate the difference between the reception amount 603 and the past reception amount 605 of the data reception status table 112 and select data included in the filter target data list in a descending order of an increase of the amount of received data, that is in a descending order of the difference between the reception amount 603 and the past reception amount 605 of the data reception status table 112.

When the filter target data list is pre-sorted in the ascending order of the value of the priority 303, or in the descending order of the increase of the amount of received data, the filter management unit 107 selects an entry from the top of the list.

The filter management unit 107 makes a determination as to whether or not selectable data exists in the filter target data list (Step S1004). That is, a determination will be made as to whether or not a process has been carried out to all data in the filter target data list.

When it is determined that selectable data does not exist in the filter target data list, the filter management unit 107 transmits a warning message to an operator in order to inform an occurrence of an abnormal situation (Step S1010), and terminates the process. This is due to inability to reduce an amount of data of the required amount of data to be reduced and that the load imposed on the data collection system is not reduced.

When it is determined that selectable data exits in the filter target data list, the filter management unit 107 calculates the data discard rate of the selected data based on the data reception status table 112 (Step S1005). To be more specific, a following process may be carried out.

The filter management unit 107 refers to the data reception status table 112 and searches for an entry where the data identifier 601 matches an identifier of the selected data. The filter management unit 107 subtracts the past reception amount 605 from the reception amount 603 of the searched entry in order to calculate an amount of data that can be reduced (a reducible amount of data). The filter management unit 107 makes a determination as to whether or not the reducible amount of data is greater than the amount of data targeted for reduction.

When it is determined that the reducible amount of data is greater than the amount of data targeted for reduction, the filter management unit 107 determines that the amount of data targeted for reduction is a reduction amount of the selected data. On the other hand, when it is determined that the reducible amount of data is not greater than the amount of data targeted for reduction, the filter management unit 107 determines that the reducible amount of data is the reduction amount of the selected data.

The filter management unit 107 calculates the data discard rate by dividing the reduction amount of the selected data by the reception amount 603.

When the reception amount 603 of the selected entry is "400", the past reception amount 605 is "200", and the amount of data targeted for reduction is "100", a following process is carried out, for example. Since the reducible amount of data is "200" which is greater than the amount of data targeted for reduction, the filter management unit 107 determines that the amount of data targeted for reduction is the reduction amount of the selected data. Further, the filter management unit 107 determines that the data discard rate is "25%" by dividing "100" of the amount of data targeted for reduction by "400" of the reception amount 603.

The filter management unit 107 transmits the filter condition setting instruction, which includes the identifier of the selected data, the filter classification, the threshold of the filter, the permissible delay time, and the calculated data discard rate to each intermediate server 120 (Step S1006).

Note that information related to the load element 701 is used for the filter classification. For example, when the load element is a bandwidth utilization amount of a network, the filter classification is "data amount".

Further, note that an arbitrary value is set for the threshold of the filter. For example, when a filter, which requires no data to be stored at the intermediate server 120, is used, "0" will set. Further, when a filter, which discards as much as 100 MB of data when an accumulated amount of data reaches 1000 MB, is used, "100/1000" will set.

Further, the permissible delay time 304 of the data management table 110 is set for the permissible delay time.

In a manner described above the intermediate server 120 sets a filter with respect to the selected data based on the filter condition setting instruction. To be more specific, the filter control unit 126 stores at the base filter table 128 a value included in the received filter condition setting instruction. Further, the filter control unit 126 adds a new entry to the data distribution table 127, stores the identifier of the selected data at a data identifier 1301, and stores a "base filter" at a distribution destination 1302.

Next, the filter management unit 107 adds an amount of data, which will be reduced by the filter set with respect to the selected data, namely the reduction amount of the selected data, to the amount of data scheduled for reduction (Step S1007). Further, the filter management unit 107 updates the filter status management table 111 (Step S1008).

To be more specific, the filter management unit 107 refers to the filter status management table 111 in order to search for an entry corresponding to the selected data. The filter management unit 107 stores information indicating that a filter is set at the filter presence indicator 403 of the searched entry. Further, the filter management unit 107 stores each value included in the filter condition setting instruction at the filter condition 404 of the searched entry.

The filter management unit 107 makes a determination as to whether or not the amount of data scheduled for reduction is greater than the required amount of data to be reduced (Step S1009).

When it is determined that the amount of data scheduled for reduction is not greater than the required amount of data to be reduced, the filter management unit 107 returns to Step S1003 and executes the same process.

When it is determined that the amount of data scheduled for reduction is greater than the required amount of data to be reduced, the filter management unit 107 is operable to reduce the load imposed on the data collection system, and thus the process is terminated.

Figure 11:
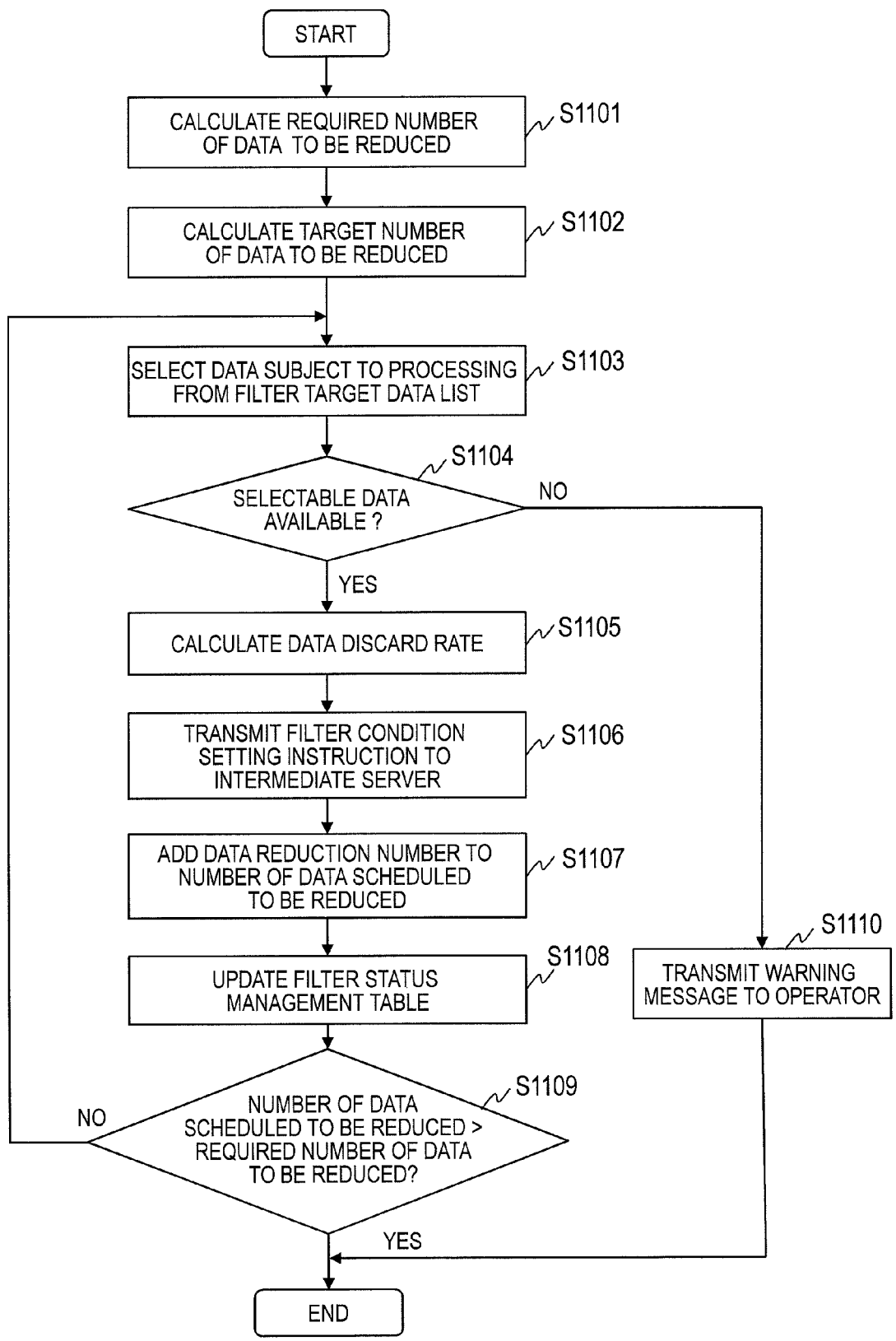
FIG. 11 is a schematic flow chart illustrating an example of a filter control process carried out in accordance with an algorithm of data number reduction by the filter management unit of the embodiment 1 according to the present invention.

FIG. 11 is a schematic flow chart illustrating an example of a filter control process carried out in accordance with an algorithm of data number reduction by the filter management unit 107 of the embodiment 1 according to the present invention.

The filter management unit 107 refers to the load monitoring table 113, and calculates the number of data to be deleted at the data collection system (Step S1101).

To be more specific, the filter management unit 107 calculates the difference between the current value 702 and the threshold 703. For example, when the number of received packets at a server is the load element, the threshold 703 is subtracted from the current value 702 of an entry corresponding to the number of received packets at the server of the load monitoring table 113 in order to calculate the number of data to be reduced.

In the description herein, the value calculated from Step S1101 will also be referred to as the required number of data to be reduced.

The filter management unit 107 calculates the number of data targeted for reduction per data based on the required number of data to be reduced and the filter target data list (Step S1102). At this point, the filter management unit 107 initializes the amount of data scheduled for reduction to "0".

Note that a method to determine the number of data targeted for reduction may include a following method. As one of such methods, the filter management unit 107 divides the calculated required number of data to be reduced by the number of types of data (i.e., number of entries) included in the filter target data list in order to calculate the number of data targeted for reduction. Further, as another such method, the filter management unit 107 multiplies a value, obtained by dividing the calculated required number of data to be reduced by the number of types of data (i.e., number of entries) included in the filter target data list, by a constant in order to calculate the number of data targeted for reduction.

By virtue of the above mentioned determination method, it becomes possible to execute a filter control where the number of data of each data type is reduced equally. Further, the number of data targeted for reduction may be determined based on the priority of each data type. For example, the filter management unit 107 calculates a ratio of the data to be reduced per each data type based on the value of the priority 303, and calculates the number of data targeted for reduction based on the calculated ratio and the required number of data to be reduced. For example, a reciprocal number of the value of the priority 303 may be used as the ratio of the data to be reduced.

Next, the filter management unit 107 selects data subject to processing from the filter target data list (Step S1103).

Note that a method to select data which is subject to processing may include a following method. As one of such methods, the filter management unit 107 refers to the priority 303 of the data management table 110 in order to select data included in the filter target data list in an ascending order of the value for the priority 303. Further, as another such method, the filter management unit 107 may calculate the difference between the reception number 602 and the past reception number 604 of the data reception status table 112 and select data included in the filter target data list in a descending order of an increase of the number of received data, that is in a descending order of the difference between the reception number 602 and the past reception number 604 of the data reception status table 112.

When the filter target data list is pre-sorted in the ascending order of the value of the priority 303, or in the descending order of the increase of the number of received data, the filter management unit 107 selects an entry from the top of the list.

The filter management unit 107 makes a determination as to whether or not selectable data exists in the filter target data list (Step S1104). That is, a determination will be made as to whether or not a process has been carried out to all data in the filter target data list.

When it is determined that selectable data does not exist in the filter target data list, the filter management unit 107 transmits a warning message to an operator in order to inform an occurrence of an abnormal situation (Step S1110), and terminates the process. This is due to inability to reduce the number of data by the required number of data to be reduced and that the load imposed on the data collection system is not reduced.

When it is determined that selectable data exits in the filter target data list, the filter management unit 107 calculates the data discard rate of the selected data based on the data reception status table 112 (Step S1105). To be more specific, a following process may be carried out.

The filter management unit 107 refers to the data reception status table 112 and searches for an entry where the data identifier 601 matches an identifier of the data selected. The filter management unit 107 subtracts the past reception number 604 from the reception number 602 of the searched entry in order to calculate the reducible number of data. The filter management unit 107 makes a determination as to whether or not the reducible number of data is greater than the number of data targeted for reduction.

When it is determined that the reducible number of data is greater than the number of data targeted for reduction, the filter management unit 107 determines that the number of data targeted for reduction is the reduction number of data of the selected data. On the other hand, when it is determined that the reducible number of data is not greater than the number of data targeted for reduction, the filter management unit 107 determines that the reducible number of data is the reduction number of data of the selected data.

The filter management unit 107 calculates the data discard rate by dividing the reduction number of data of the selected data by the reception number 602.

When the reception number 602 of the selected entry is "100", the past reception number 604 is "50", and the number of data targeted for reduction is "100", a following process is carried out, for example. Since the reducible number of data is "50" which is smaller than the number of data targeted for reduction, the filter management unit 107 determines that the number of reducible data is the reduction number of data of the selected data. Further, the filter management unit 107 determines that the data discard rate is "50%" by dividing "50" of the number of reducible data by "100" of the reception number 602.

The filter management unit 107 transmits the filter condition setting instruction, which includes the identifier of the selected data, the filter classification, the threshold of the filter, and the calculated data discard rate to each intermediate server 120 (Step S1106).

Note that information related to the load element 701 is used for the filter classification. For example, when the load element is the number of received packets at a server, the filter classification is "data number".

Further, note that an arbitrary value is set for the threshold of the filter. For example, when a filter, which requires no data to be stored at the intermediate server 120, is used, "0" will set. Further, when a filter, which discards as many as 1 data when the accumulated number of data reaches 5, is used, "1/5" will set.

Further, the permissible delay time 304 of the data management table 110 is set for the permissible delay time.

In a manner described above the intermediate server 120 sets a filter with respect to the selected data based on the filter condition setting instruction. To be more specific, the filter control unit 126 stores at the base filter table 128 a value included in the received filter condition setting instruction. Further, the filter control unit 126 adds a new entry to the data distribution table 127, stores the identifier of the selected data at a data identifier 1301, and stores a "base filter" at a distribution destination 1302.

The filter management unit 107 adds the number of data, which will be reduced by the filter set with respect to the selected data, namely the reduction number of data of the selected data, to the number of data scheduled for reduction (Step S1107). Further, the filter management unit 107 updates the filter status management table 111 (Step S1108).

To be more specific, the filter management unit 107 refers to the filter status management table 111 in order to search for an entry corresponding to the selected data. The filter management unit 107 stores information indicating that a filter is set at the filter presence indicator 403 of the searched entry. Further, the filter management unit 107 stores each value included in the filter condition setting instruction at the filter condition 404 of the searched entry.

The filter management unit 107 makes a determination as to whether or not the number of data scheduled for reduction is greater than the required number of data to be reduced (Step S1109).

When it is determined that the number of data scheduled for reduction is not greater than the required number of data to be reduced, the filter management unit 107 returns to Step S1103 and executes the same process.

When it is determined that the number of data scheduled for reduction is greater than the required number of data to be reduced, the filter management unit 107 is operable to reduce the load imposed on the data collection system, and thus the process is terminated.

Figure 12:
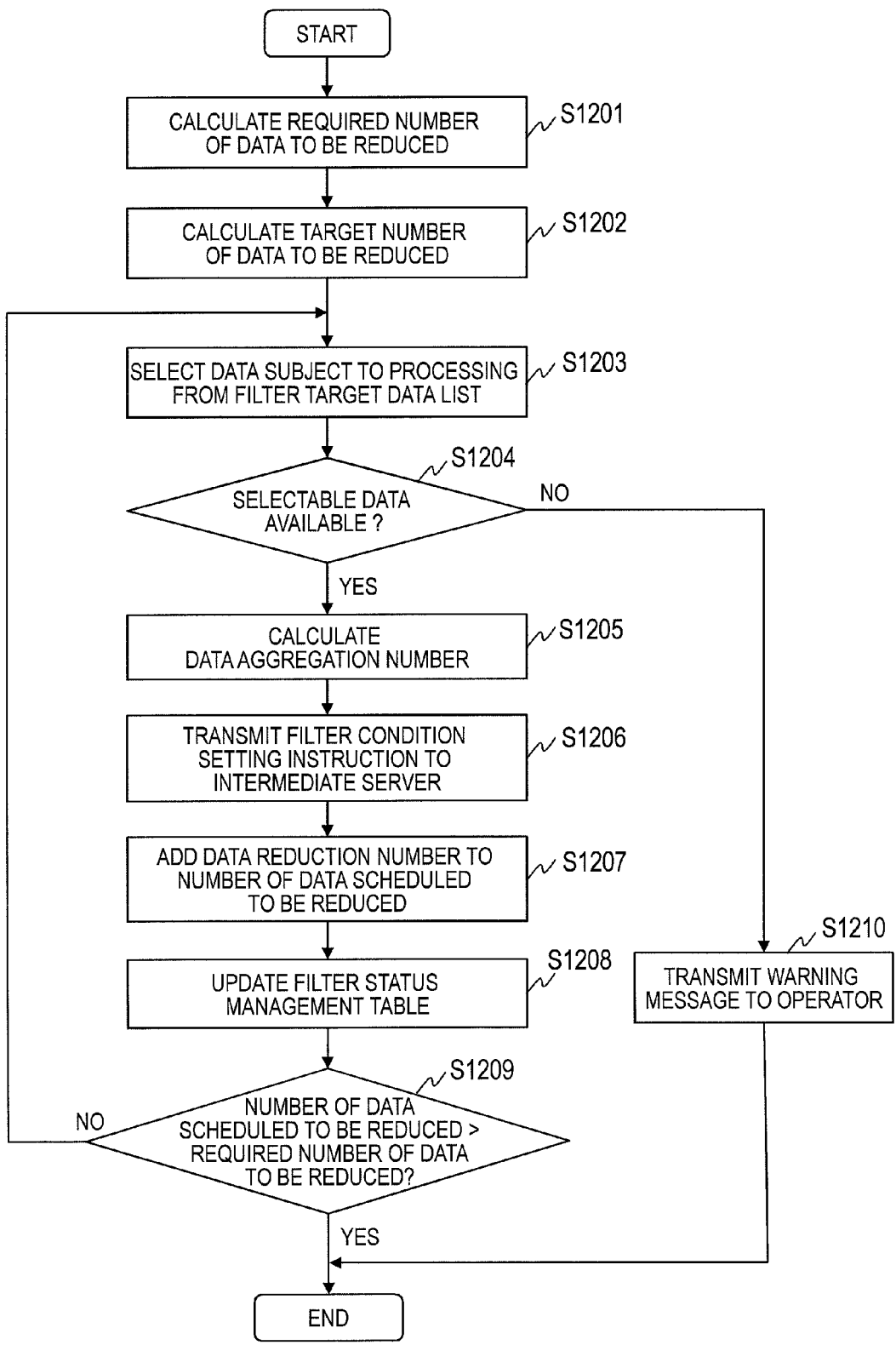
FIG. 12 is a schematic flow chart illustrating an example of the filter control process carried out in accordance with an algorithm of data aggregation by the filter management unit of the embodiment 1 according to the present invention.

FIG. 12 is a schematic flow chart illustrating an example of the filter control process carried out in accordance with an algorithm of data aggregation by the filter management unit 107 of the embodiment 1 according to the present invention.

The filter management unit 107 refers to the load monitoring table 113, and calculates the amount of data to be reduced at the data collection system (Step S1210).

To be more specific, the filter management unit 107 calculates the difference between the current value 702 and the threshold 703. For example, when the number of processing sessions at the database is the load element, filter management unit 107 calculates the number of data to be reduced by subtracting the threshold 703 from the current value 702 of an entry corresponding to the number of processing sessions of the database of the load monitoring table 113.

In the description herein, the value calculated from Step S1201 will also be referred to as a required number of data to be reduced.

The filter management unit 107 calculates the number of data targeted for aggregation per data based on the calculated required number of data to be reduced and the filter target data list (Step S1202). At this point, the filter management unit 107 initializes the amount of data scheduled for reduction to "0".

Note that a method to determine the number of data targeted for reduction may include a following method. As one of such methods, the filter management unit 107 divides the calculated required number of data to be reduced by the number of types of data (i.e., number of entries) included in the filter target data list in order to calculate the number of data targeted for reduction. Further, as another such method, the filter management unit 107 multiplies a value, obtained by dividing the calculated required number of data to be reduced by the number of types of data (i.e., number of entries) included in the filter target data list, by a constant in order to calculate the number of data targeted for reduction.

Next, the filter management unit 107 selects data which is subject to processing from the filter target data list (Step S1203).

The filter management unit 107 selects an entry from the top of the filter target data list since the filter target data list is sorted in a descending order of the increase of the number of received data.

The filter management unit 107 makes a determination as to whether or not selectable data exists in the filter target data list (Step S1204). That is, a determination will be made as to whether or not a process has been carried out to all data in the filter target data list.

When it is determined that selectable data does not exist in the filter target data list, the filter management unit 107 transmits a warning message to an operator in order to inform an occurrence of an abnormal situation (Step S1210), and terminates the process. This is due to inability to reduce the number of data by the required number of data to be reduced and that the load imposed on the data collection system is not reduced.

When it is determined that selectable data exits in the filter target data list, the filter management unit 107 calculates the number of data to be aggregated at the selected data based on the data reception status table 112 (Step S1205). To be more specific, a following process may be carried out.

The filter management unit 107 refers to the data reception status table 112 and searches for an entry where the data identifier 601 matches an identifier of the data selected. The filter management unit 107 subtracts the past reception number 604 from the reception number 602 of the searched entry in order to calculate a reducible number of data. The filter management unit 107 makes a determination as to whether or not the reducible number of data is greater than the number of data targeted for reduction.

When it is determined that the reducible number of data is greater than the number of data targeted for reduction, the filter management unit 107 determines that the number of data targeted for reduction is a reduction number of data of the selected data. On the other hand, when it is determined that the reducible number of data is not greater than the number of data targeted for reduction, the filter management unit 107 determines that the reducible number of data is the reduction number data of the selected data.

The filter management unit 107 calculates a reception schedule number by subtracting the reduction number of data of the selected data from the reception number 602. Further, the filter management unit 107 calculates the number of data to be aggregated by dividing the reception number 602 by the calculated reception schedule number.

When the reception number 602 of the searched entry is "400", the past reception number 604 is "400", and the number of data targeted for reduction is "200", a following process is carried out, for example. Since the reducible number of data is "300" which is greater than the number of data targeted for reduction, the filter management unit 107 determines that the number of data targeted for reduction is the reduction number of data of the selected data. Further, the filter management unit 107 calculates that the reception schedule number is "200" by subtracting the number of data of the selected data to be reduced, which is "200", from the reception number 602, which is "400". Further, the filter management unit 107 determines that the number of data to be aggregated is "2" by dividing the reception number 602, which is "400", by the reception schedule number, which is "200".

Next, the filter management unit 107 transmits the filter condition setting instruction, which includes the identifier of the selected data, the filter classification, the permissible delay time, and the calculated number of data to be aggregated, to each intermediate server 120 (Step S1206).

Note that information related to the load element 701 is used for the filter classification. For example, when the load element is the number of processing sessions of the database, the filter classification is "number of sessions". The permissible delay time 304 of the data management table 110 will be set as the permissible delay time. Further, the number of data to be aggregated, which is determined, corresponds to the threshold of the filter. In a manner described above the intermediate server 120 sets a filter with respect to the selected data based on the filter condition setting instruction. To be more specific, the filter control unit 126 stores at the base filter table 128 a value included in the received filter condition setting instruction. Further, the filter control unit 126 adds a new entry to the data distribution table 127, stores the identifier of the selected data at a data identifier 1301, and stores a "base filter" at a distribution destination 1302.

The filter management unit 107 adds the number of data, which will be reduced by the filter set with respect to the selected data, namely the reduction number of data of the selected data, to the number of data scheduled for reduction (Step S1207). Further, the filter management unit 107 updates the filter status management table 111 (Step S1208).

To be more specific, the filter management unit 107 refers to the filter status management table 111 in order to search for an entry corresponding to the selected data. The filter management unit 107 stores information indicating that a filter is set at the filter presence indicator 403 of the searched entry. Further, the filter management unit 107 stores each value included in the filter condition setting instruction at the filter condition 404 of the searched entry.

The filter management unit 107 makes a determination as to whether or not the number of data scheduled for reduction is greater than the required number of data to be reduced (Step S1209).

When it is determined that the number of data scheduled for reduction is not greater than the required number of data to be reduced, the filter management unit 107 returns to Step S1203 and executes the same process.

When it is determined that the number of data scheduled for reduction is greater than the required number of data to be reduced, the filter management unit 107 is operable to reduce the load imposed on the data collection system, and thus the process is terminated.

<Description on Intermediate Server>

Firstly, a table included at the intermediate server 120 will be described with reference to FIG. 13 and FIG. 14.

FIG. 13 is a schematic diagram illustrating an example of the data distribution table 127 included at the intermediate server 120 of the embodiment 1 according to the present invention.

The data distribution table 127 includes fields of a data identifier 1301 and a distribution destination 1302.

The data identifier 1301 is a field for storing therein an identifier for identifying data transmitted from the sensor 130, and is identical to the data identifier 301. The data distribution destination 1302 is a field for storing therein an identifier of a filter function unit to which data corresponding to the data identifier 1301 is transferred.

The data distribution unit 122, upon receiving data from the sensor 130, refers to the data distribution table 127 in order to search for an entry matching the data by using an identifier of the received data as a search key, and transfers the received data to the filter function unit corresponding to the distribution destination 1302 of the searched entry.

FIG. 14 is a schematic diagram illustrating an example of the base filter table 128 included at the intermediate server 120 of the embodiment 1 according to the present invention.

The base filter table 128 includes fields of a data identifier 1401, and a filter condition 1402.

The data identifier 1401 is a field for storing therein an identifier for identifying data transmitted from the sensor 130, and is identical to the data identifier 301. The filter condition 1402 is a filed for storing therein a process content of a filter, and is identical to the filter condition 401. The filter condition 1402 stores therein each value included in the filter condition setting instruction.

Note that although the data distribution table 127 and the base filter table 128 are managed in a manner independently from one another according to the present embodiment, the data distribution table 127 and the base filter table 128 may be managed as a single table in a collective manner. When the data distribution table 127 and the base filter table 128 are managed collectively, the intermediate server 120 includes a table which includes the data identifier, the distribution destination, and the filter condition.

Figure 15:
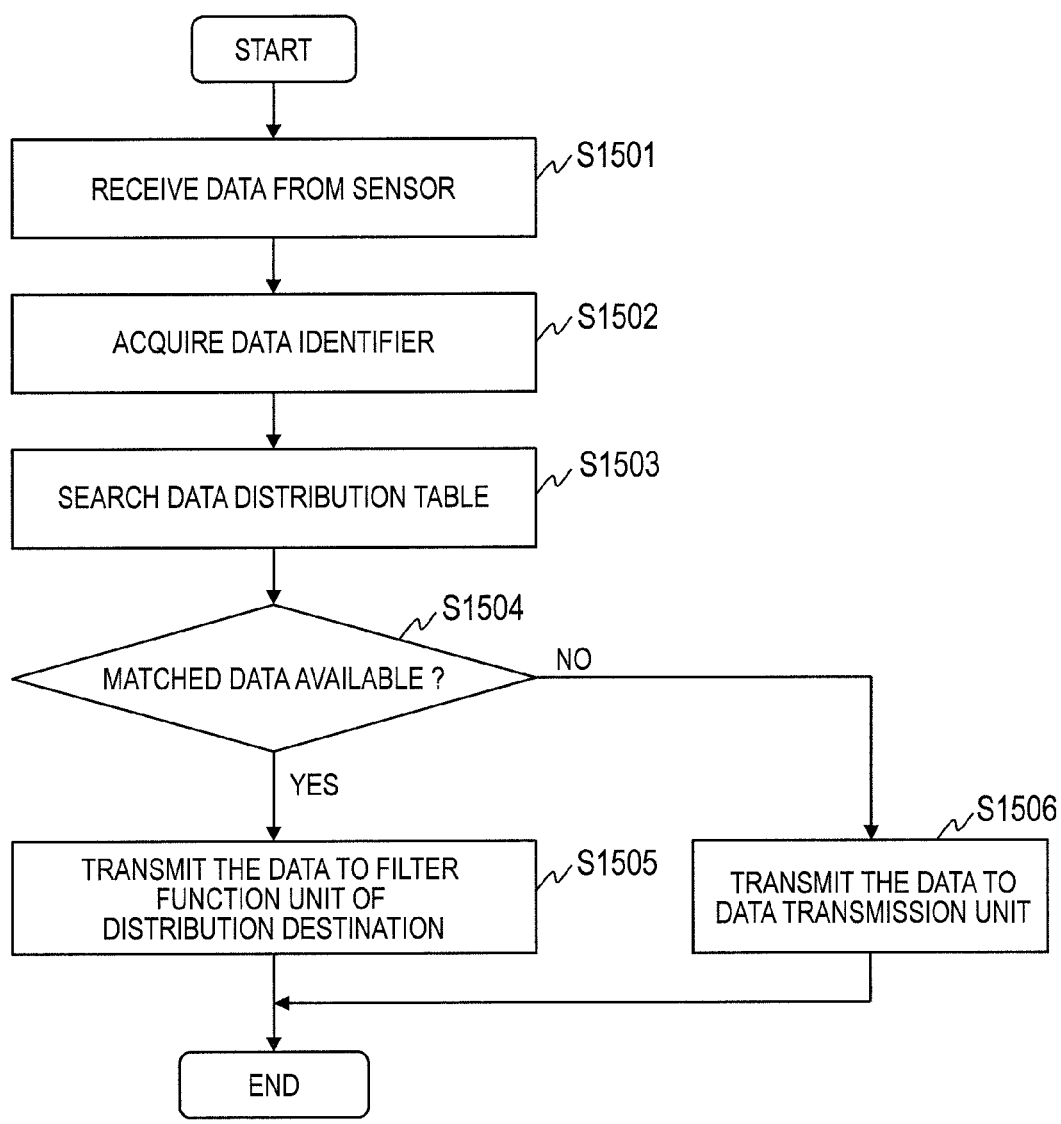
FIG. 15 is a schematic flow chart illustrating an example of the data distribution process carried out by a data distribution unit at the intermediate server of the embodiment 1 according to the present invention.

FIG. 15 is a schematic flow chart illustrating an example of a data distribution process carried out by the data distribution unit 122 at the intermediate server 120 of the embodiment 1 according to the present invention.

The data distribution unit 122 receives data from the sensor data reception unit 123 (Step S1501), and acquires a data identifier from the received data (Step S1502).

The data distribution unit 122 refers to the data distribution table 127 in order to search for an entry matching the data identifier by using the acquired data identifier as a search key (Step S1503). The data distribution unit 122 makes a determination based on the search result as to whether or not an entry matching the acquired data identifier is available (Step S1504). When an entry matching the acquired data identifier is available, the data distribution unit 122 indicates that a filter corresponding to the data is set.

When it is determined that an entry matching the acquired data identifier is available, the data distribution unit 122 transfers the data to the filter function unit corresponding to the distribution destination 1302 of the searched entry (Step S1505), and terminates the process.

When it is determined that an entry matching the acquired data identifier is not available, the data distribution unit 122 transfers the data to the data transmission unit 121 in order to transmit the data as it stands to the data collection server 100 (Step S1506), and terminates the process.

Figure 16:
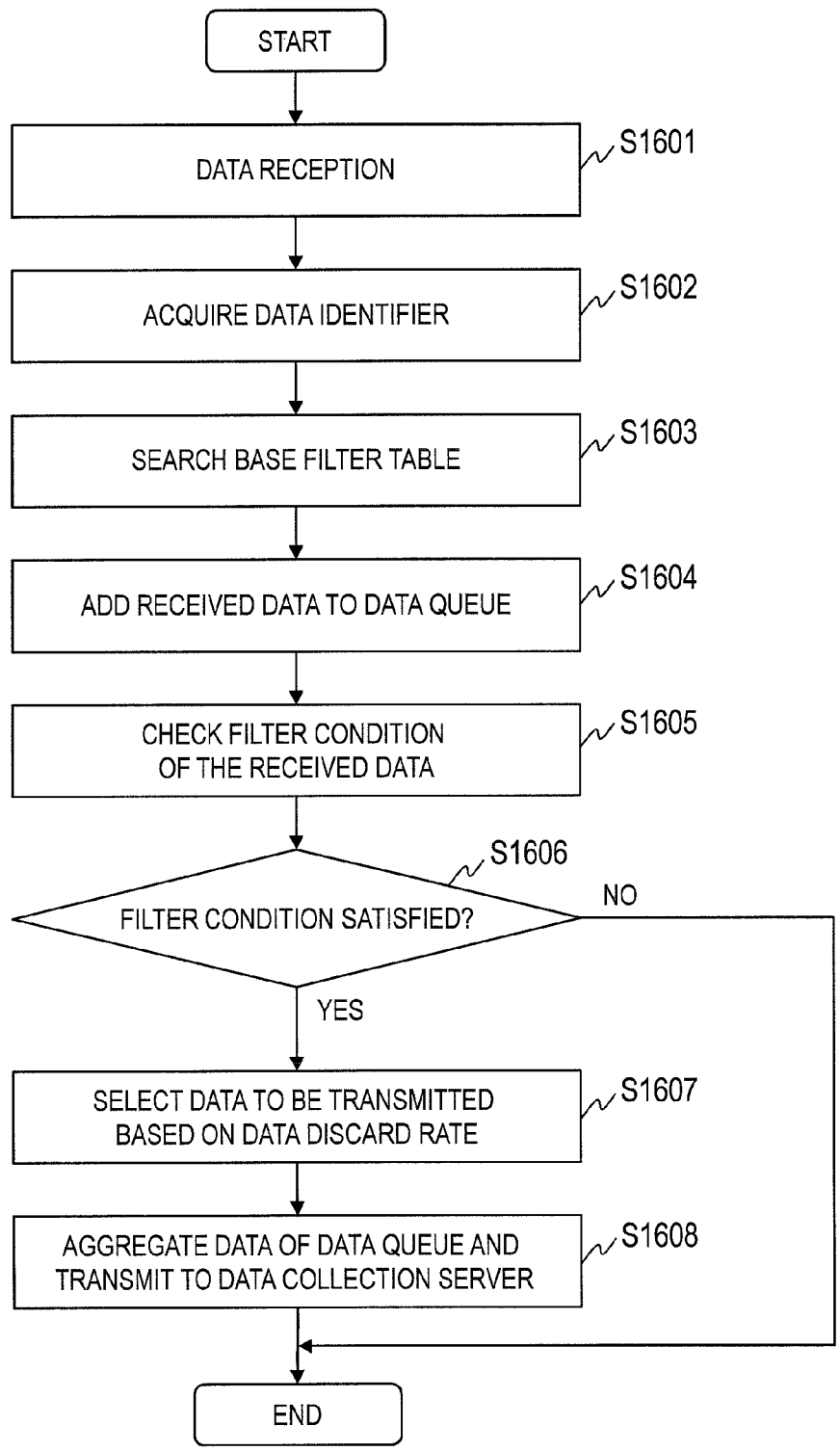
FIG. 16 is a schematic flow chart illustrating an example of a filter process carried out by a base data filter unit at the intermediate server of the embodiment 1 according to the present invention.

FIG. 16 is a schematic flow chart illustrating an example of filter processing carried out by the base data filter unit 124 at the intermediate server 120 of the embodiment 1 according to the present invention.

The base data filter unit 124 receives data from the data distribution unit 122 (Step S1601), and acquires a data identifier from the received data (Step S1602).

The base data filter unit 124 refers to the base filter table 128 in order to search for an entry matching the data identifier using the acquired data identifier as a search key (Step S1603).

The base data filter unit 124 adds the received data to a data queue which is configured to temporarily retain received data (Step S1604). Note that the data queue is prepared for each data type according to the present embodiment. When the data queue is prepared for each data type, the base data filter unit 124 stores the received data at the data queue corresponding to the data identifier.

The base data filter unit 124 checks a filter condition of the received data (Step S1605), and makes a determination as to whether or not a status of the data queue meets the filter condition (Step S1606).

To be more specific, the base data filter unit 124 checks the filter condition 1402 of the entry searched for at Step S1603. The base data filter unit 124 makes a determination, based on the accumulation status of data at the data queue, as to whether or not the status of the data queue meets the filter condition 1402.

When it is determined that the status of the data queue does not meet the filter condition, the base data filter unit 124 terminates the process.

When it is determined that the status of the data queue meets the filter condition, the base data filter unit 124 selects data to be transmitted to the data collection server 100 based on the data discard rate stored at the filter condition 1402 (Step S1607).

To be more specific, the base data filter unit 124 discards a predetermined number of data or a predetermined amount of data out of the data stored at the data queue in accordance with the data discard rate stored at the filter condition 1402. Note that the data stored at the data queue is the data which will be transmitted to the data collection server 100.

The base data filter unit 124 aggregates a plurality of data stored at the data queue into a single data, transfers the aggregated data to the data collection server 100 (Step S1608), and terminates the process.

Hereinafter, a specific example of the present invention will be described.

Figure 17:
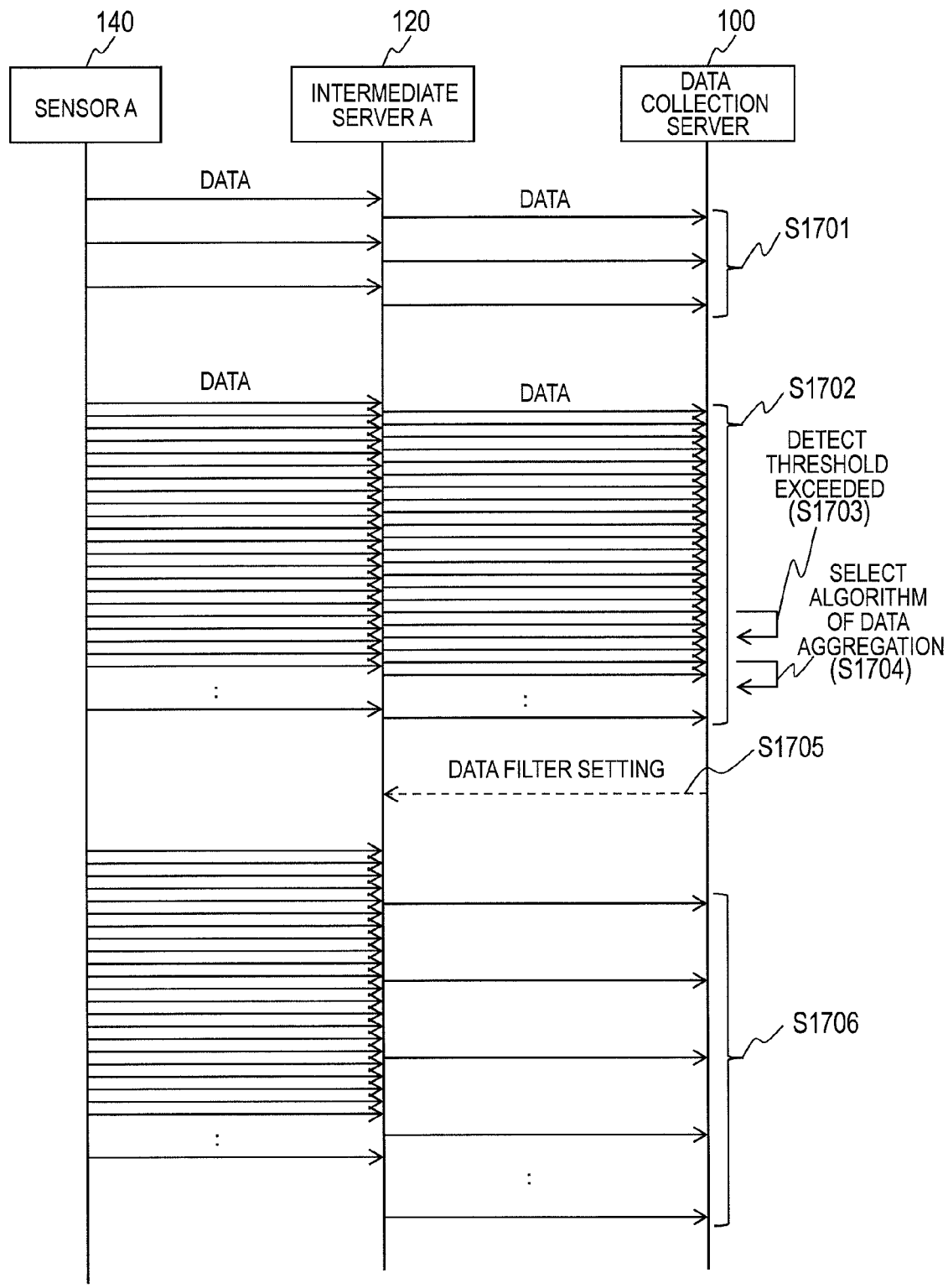
FIG. 17 is a schematic sequence diagram illustrating a flow of the filter processing carried out in accordance with an algorithm of data number aggregation of the data collection system of the embodiment 1 according to the present invention.

FIG. 17 is a schematic sequence diagram illustrating a flow of the filter control carried out in accordance with an algorithm of data number aggregation of the data collection system of the embodiment 1 according to the present invention.

Note that in the following description, the data collection server 100 receives data, whose data identifier 301 is "A," from the sensor A (130-1). Further, the data management table 110 is as shown in FIG. 2, while the algorithm selection table 114 is as shown in FIG. 8.

In a state during Step S1701, the data collection server 100 receives data which is within a threshold range from the sensor A (130-1).

In a state during Step S1702, the number of received data increases, and the data reception status table 112 is as shown in FIG. 6. Further, the load monitoring table 113 is as shown in FIG. 7.

At this point, a value for the current value 702 of an entry where the load element 701 corresponds to the number of received packets at a server is "1200", which exceeds the threshold 703, which is "900". Accordingly, at Step S1703 the load monitoring unit 106 detects that the number of received packets at the server exceeds the threshold 703, and invokes the filter management unit 107. At this point, the load information is transmitted to the filter management unit 107 (Step S901).

At Step S1704 the filter management unit 107 selects an applicable filter control algorithm from the algorithm selection table 114 using the number of received packets at the server as a search key (Step S902). At this point, an algorithm for data number aggregation will be selected.

The filter management unit 107 sorts entries at the data reception status table 112 in an ascending order of the priority 303 to generate the filter target data list (Step S903).

According to the data management table 110 shown in FIG. 6, the data whose data identifier 301 is "A" is at the top of the filter target data list since the data whose data identifier 301 is "A" has a priority lower than a priority of the data whose data identifier 301 is "B," that is, the data whose data identifier 301 is "A" has a higher value of the priority 303.

The filter management unit 107 using the filter target data list executes a filter control process in accordance with a data number aggregation algorithm (Step S904). To be more specific, the filter control process as shown in FIG. 12 is carried out.

According to the data number aggregation algorithm, the filter management unit 107 calculates that the required number of data to be reduced is "200" by subtracting the difference of the threshold 703 from the current value 702 of the number of received packets at the server (Step S1201). Further, the filter management unit 107 calculates that the amount of data targeted for reduction is "100" (Step S1202).

For the data whose data identifier is "A," the reducible number of data is "200" which is greater than the number of data targeted for reduction. Accordingly, the filter management unit 107 calculates that the reception schedule number is "50" and determines that the number of data to be aggregated is "5" by dividing "250" of the reception number 602 by "50" of the reception schedule number (Step S1205).

At Step S1705 the filter management unit 107 transmits the filter condition setting instruction to the intermediate server 120, and updates the filter status management table 1208. At this point, the filter status management table 111 is updated as shown in FIG. 4 and FIG. 5 (Step S1208).

The filter control unit 126 of the intermediate server 120 receives the filter condition setting instruction, and generates a new entry to the base filter table 128. The filter control unit 126 stores "A" at the data identifier 1401 of the generated entry, and stores a value of the filter condition such as shown in FIG. 5 at the filter condition 1402.

Since a filter is set with respect to the data identifier A, the intermediate server 120, when the data queue accumulates 5 of the data received from the sensor A (130-1) and whose data identifier is "A," aggregates the 5 such data into 1, and transmits the aggregated data to the data collection server 100.

Consequently, as in Step S1706, the number of data transmitted to the data collection server 100 is reduced. According to the present specific example, since only the data whose data identifier is "A" is received, the load imposed on the data collection system is reduced at this point. Further, when multiple types of data are involved, a similar process is carried out.

According to the embodiment 1 as described above, it is possible to reduce the load imposed on the data collection system 100 by reducing, in accordance with the load imposed on the data collection system, the amount of data and/or the number of data of the data transmitted to the data collection server 100.

Embodiment 2

An embodiment 2 is different from the embodiment 1 in that while according to the embodiment 1 a filter is set to each intermediate server 120 per each data type, according to the embodiment 2 an intermediate server 120 to which a filter is set is selected in accordance with a status concerning a load imposed thereon.

Hereinafter, the embodiment 2 will be described with focus on differences between the two embodiments.

Figure 18:
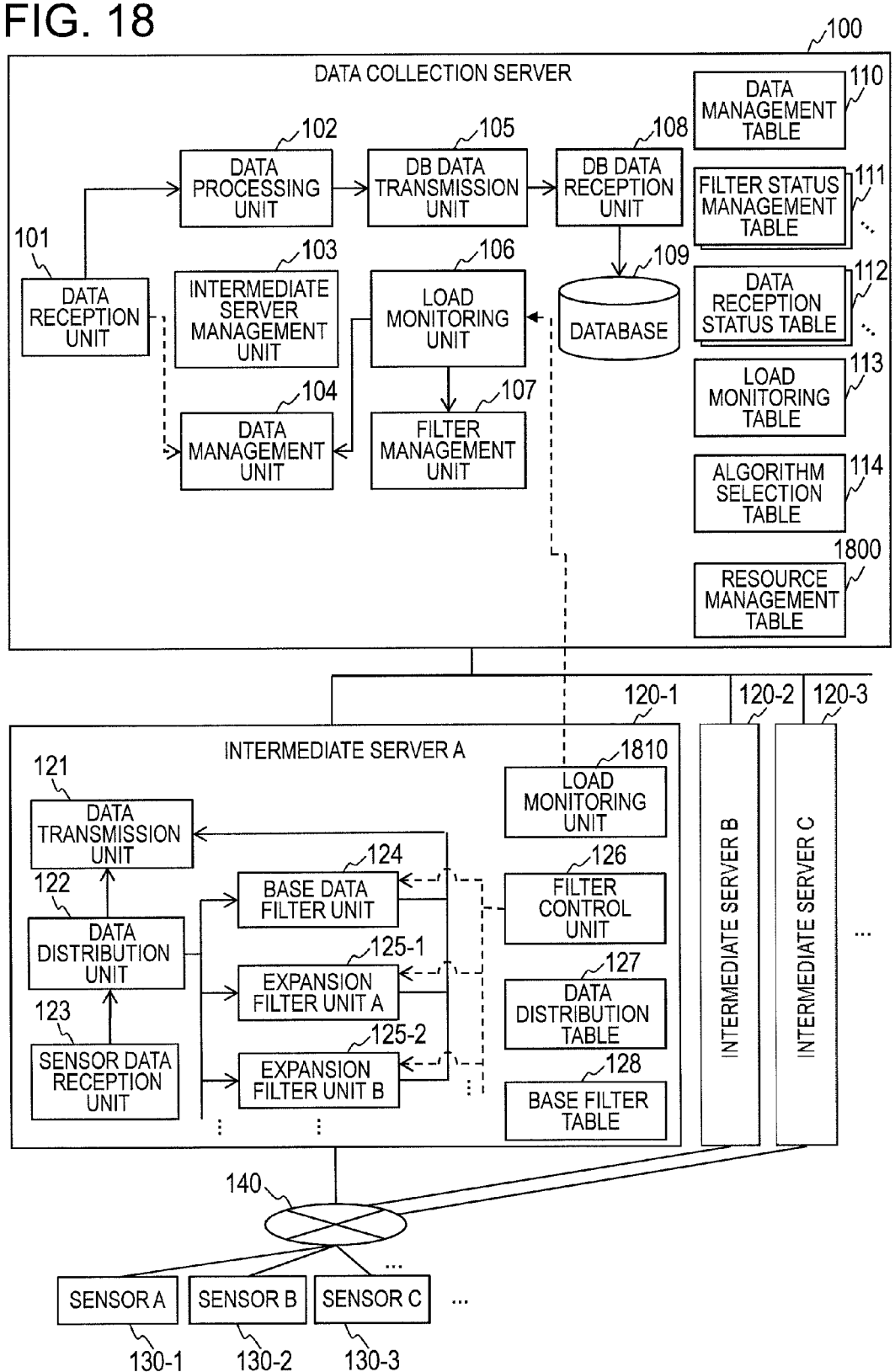
FIG. 18 is a schematic diagram illustrating an example of a configuration of a data collection system of an embodiment 2 according to the present invention.

FIG. 18 is a schematic diagram illustrating an example of a configuration of a data collection system of the embodiment 2 according to the present invention.

Note that each function block, which is depicted in FIG. 18 and is assigned with a reference numeral same as one that is used for the configuration of the data collection system depicted in FIG. 1, includes an identical function, and therefore, the description thereof will be omitted.

As shown in FIG. 18, according to the present embodiment, the intermediate server 120 additionally includes a load monitoring unit 1810, and the data collection server 100 additionally includes a resource management table 1800.

The load monitoring unit 1810 periodically monitors the load (i.e., usage status of resources) imposed on the intermediate server 120, and transmits information, which includes the usage status of resources (i.e., monitor results) to the data collection server 100.

The resource management table 1800 stores therein information related to the resource usage status at each intermediate server 120. The load monitoring unit 106 of the data collection server 100 updates the resource management table 1800 each time the load monitoring unit 106 receives a monitoring result from each intermediate server 120.

According to the present embodiment, the data collection server 100 includes the filter status management table 111 for each intermediate server 120, which is due to that each intermediate server 120 may require a filter different from one that is required by another intermediate server 120. Further, the data collection server 100 includes the data reception status table 112 per each intermediate server 120.

Note that the description for a hardware configuration for the data collection server 100 and the intermediate server 120 according to the embodiment 2 will be omitted since they are the same as those for the embodiment 1. Further, tables included at the data collection server 100 and the intermediate server 120 according to embodiment 2 are the same as those for embodiment 1, and thus the description therefor will be omitted.

Figure 19:
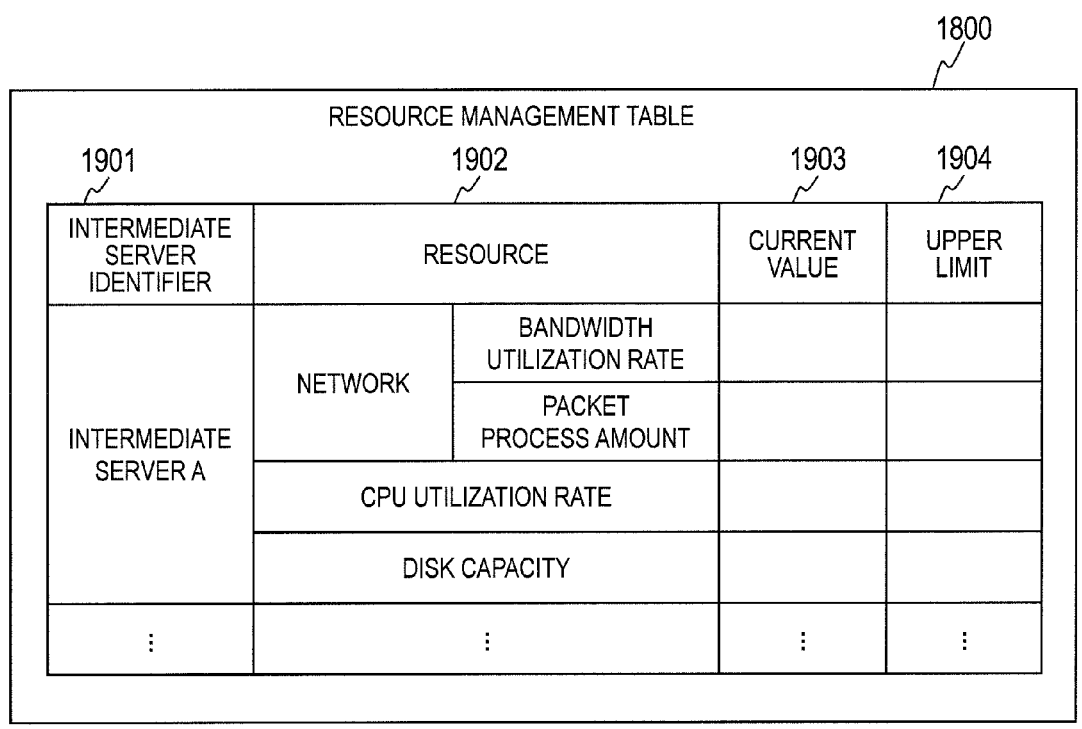
FIG. 19 is a schematic diagram illustrating an example of a resource management table included at the data collection system of the embodiment 2 according to the present invention.

FIG. 19 is a schematic diagram illustrating an example of the resource management table 1800 included at the data collection system 100 of the embodiment 2 according to the present invention.

The resource management table 1800 includes fields of an intermediate server identifier 1901, a resource 1902, a current value 1903, and an upper limit 1904.

The intermediate server identifier 1901 is a field for storing therein an identifier for identifying the intermediate server 120.

The resource 1902 is a field for storing therein information used to identify a resource provided at the intermediate server 120. The resource information provided at the intermediate server 120 may include a network bandwidth utilization rate, a packet process amount, a CPU utilization rate, and/or a disk capacity, or the like.

The current value 1903 is a field for storing therein a value corresponding to the current resource 1902 at the intermediate server 120. The value stored at the current value 1903 is periodically updated by the load monitoring unit 1801.

The upper limit 1904 is a field for storing therein an upper limit which is set with respect to the resource 1902 at the intermediate server 120.

Note that a process carried out according to the embodiment 2, is the same as the process carried out according to the embodiment 1, except for the process concerning the load reduction algorithm.

Figure 20:
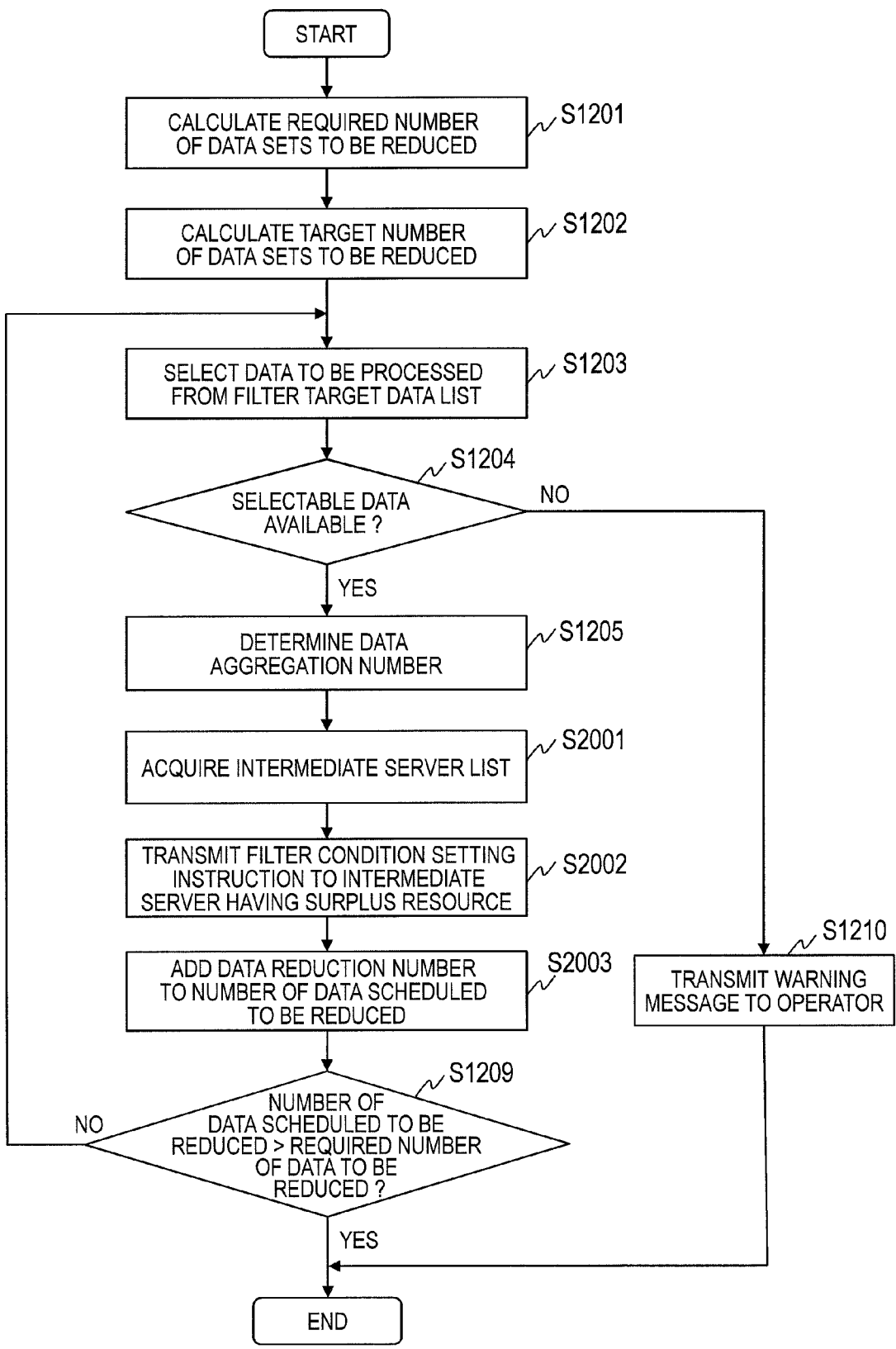
FIG. 20 is a schematic flow chart illustrating an example of a filter control process carried out in accordance with data aggregation algorithm by a filter management unit of the embodiment 2 according to the present invention.

FIG. 20 is a schematic flow chart illustrating an example of a filter control process carried out in accordance with data aggregation algorithm by the filter management unit 107 of the embodiment 2 according to the present invention.

Note that the filter control process according to the embodiment 2 is the same as that according to the embodiment 1, and thus, the descriptions for the process step assigned with the reference numeral same as that used in FIG. 12 will be omitted.

Note that the embodiment 2 is different from the embodiment 1 in that after the number of data to be aggregated has been determined, the filter condition setting instruction is transmitted to the intermediate server 120 which has a surplus in a resource thereof. Hereinafter, the difference between the filter control process according to the embodiment 1 and the filter control process according to the embodiment 2 will be described.

After the number of data to be aggregated has been determined (Step S1205), the filter management unit 107 acquires a list of the intermediate server 120 which transmits the selected data (Step S2001). To be more specific, a following process will be carried out.

The filter management unit 107 refers, using the identifier of the selected data as a search key, to one data reception status table 112. Further, the filter management unit 107 makes a determination as to whether or not said data reception status table 112 includes an entry where the data identifier 601 matches the identifier of the selected data.

When it is determined that the data reception status table 112 does not include the entry where the data identifier 601 matches the identifier of the selected data, the filter management unit 107 repeats the same search process with another data reception status table 112.

On the other hand, when it is determined that the data reception status table 112 includes the entry where the data identifier 601 matches the identifier of the selected data, the filter management unit 107 adds the intermediate server 120 which corresponds to the data reception status table 112 to the list. Then, the filter management unit 107 repeats the same search process with the next data reception status table 112.

Next, the filter management unit 107 transmits the filter condition setting instruction to the intermediate server 120 having a surplus in the resource thereof based on the resource management table 1800 and the acquired list of the intermediate server 120 (Step S2002). A detail of the process carried out at Step S2002 will be described below with reference to FIG. 21.

Next, the filter management unit 107 adds the number of data, which will be reduced by transmitting the filter condition setting instruction to the intermediate server 120, to the number of data scheduled for reduction (Step S2003).

Figure 21:
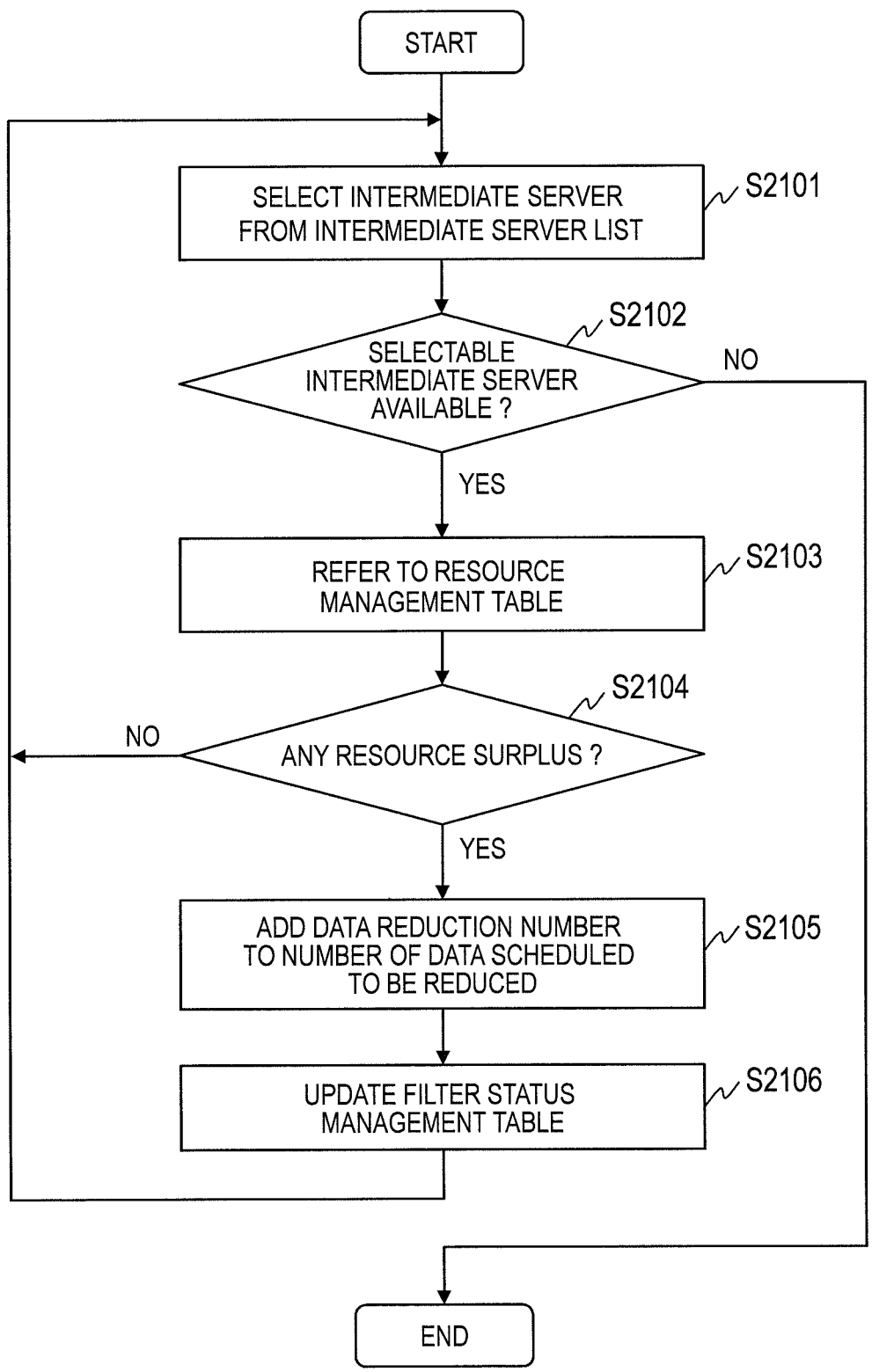
FIG. 21 is a schematic flow chart illustrating in detail a process carried out at Step S2002 of the embodiment 2 according to the present invention.

FIG. 21 is a schematic flow chart illustrating in detail the process carried out at Step S2002 of the embodiment 2 according to the present invention.

The filter management unit 107 selects one intermediate server 120 from the acquired list of intermediate server 120 (Step S2101).

Note that the selection of an entry will be made from the top of the list. Also note that, a selection index of importance, or the like, may be set for each intermediate server 120 wherein the intermediate server 120 is selected in accordance with the selection index.

The filter management unit 107 makes a determination as to whether or not the list of intermediate server 120 includes a selectable intermediate server 120 (Step S2102).

When it is determined that the list does not include a selectable intermediate server 120, the filter management unit 107 terminates the process since there is not subject to which the filter condition setting instruction is transmitted.

When it is determined that the list includes a selectable intermediate server 120, the filter management unit 107 refers to an entry corresponding to the selected intermediate server 120 of the resource management table 1800 (Step S2103).

The filter management unit 107 makes a determination as to whether or not the selected intermediate server 120 has a surplus in the resource thereof (Step S2104).

For example, the filter management unit 107 refers to the current value 1903 and the upper limit 1904 of the CPU utilization rate in order to calculate the CPU utilization rate for a new filter being set, and determines that the selected intermediate server 120 has a surplus in the resource thereof when the calculated new CPU utilization rate is smaller than the upper limit 1904. Note that an increased value of the CPU utilization rate when a new filter is set may include a constant preset for each filter.

Note that although the above mentioned determination process focused on the CPU utilization rate as the resource 1902, the resource 1902 may include an index such as the memory utilization amount and/or the storage utilization amount, or the like, of the intermediate server 120 when a new filter is set. In a case the memory utilization amount or the storage utilization amount is used as the index, when the memory utilization amount or the storage utilization amount is smaller than the upper limit 1904, it will be determined that the selected intermediate server 120 has a surplus in the resource thereof.

When it is determined that the selected intermediate server 120 has a surplus in the resource thereof, the filter management unit 107 calculates the number of data of the selected data to be reduced in a case where a new filter is set for the selected intermediate server 120, and adds the calculated number of data to be reduced to the number of data scheduled for reduction (Step S2105). Further, the filter management unit 107 updates the filter status management table 111 (Step S2106).

To be more specific, the filter management unit 107 searches the selected filter status management table 111. The filter management unit 107 refers to the searched filter status management table 111 to search for an entry corresponding to the selected data. The filter management unit 107 stores information, which indicates that a filter is set with respect to the filter presence indicator 403 of the searched entry. Further, the filter management unit 107 stores each value included in the filter condition setting instruction at the filter condition 404 of the searched entry.

When it is determined that the selected intermediate server 120 does not have a surplus in the resource thereof, the filter management unit 107 returns to Step S2101 to execute the same process.

According to the embodiment 2, it is possible to efficiently disperse the load imposed on the data collection system since it is operable to set a filter in consideration of the load imposed on each intermediate server 120.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or a solid state drive, or a storage medium such as an IC card, or an SD card. The drawings shows control lines and information lines as considered necessary for explanation but do not show all control lines or information lines in the products. It can be considered that almost of all components are actually interconnected.

What is claimed is:

1. A computer system comprising:
a plurality of sensors each configured to transmit data of a predetermined data type;
a plurality of servers configured to transfer data transmitted from the plurality of sensors; and
a data collection server configured to receive the data transferred from the plurality of servers and accumulate the received data,
wherein each of the plurality of servers includes a first processor, a first memory connected to the first processor, a first network interface connected to the first processor, and a plurality of filter units configured to execute filter processing to acquire data to be transferred to the data collection server out of data transmitted from the plurality of sensors,
wherein the data collection server includes a second processor, a second memory connected to the second processor, and a second network interface connected to the second processor,
wherein the data collection server includes:
a load monitoring unit configured to monitor a load on the computer system; and
a management unit configured to, based on a result of the monitoring, determine a content of a transfer process of data executed at one of the plurality of servers and transmit the determined content of the transfer process of data to the one of the plurality of servers, and
wherein the management unit is configured to:
determine a type of the transfer process and a content of filter processing applied to the one of the plurality of servers;
generate a process subject data list indicating a list of data to which the transfer process is applied out of the data transferred to the data collection server based on the determined type of the transfer process;
determine the content of the transfer process applied to the one of the plurality of servers based on the determined type of the transfer process and the generated process subject data list;
calculate, when determining the content of filter processing, a first data reduction target value indicating one of an amount of data to be reduced and a number of data to be reduced at the computer system based on the result of monitoring of the load;
calculate a second data reduction target value indicating one of an amount of data to be reduced and a number of data to be reduced per data type out of the data transmitted from the plurality of sensors; and
determine a reduction value for each data type included at the generated process subject data list based on the generated process subject data list, the calculated first data reduction target value, and the calculated second data reduction target value.

2. The computer system according to claim 1,
wherein each of the plurality of servers includes:
a filter control unit configured to control the filter processing executed at the plurality of filter units;
a filter distribution unit configured to select one filter unit out of the plurality of filter units to execute processing on data transmitted from the plurality of sensors based on a data type of the data transmitted from the plurality of sensors; and
filter management information configured to associate data types of data transmitted from the plurality of sensors, identifiers of the plurality of filter units, and types of the filter processing,
wherein the data collection server includes algorithm selection information configured to manage a type of filter processing used in the plurality of servers for each type of load on the computer system,
wherein the management unit is configured to:
determine a type of filter processing applied at the one of the plurality of servers based on a result of the monitoring and the algorithm selection information;
generate, based on the determined type of filter processing, the process subject data list by extracting, out of data accumulated at the data collection server, data to which the determined type of filter processing is applied;
determine the content of filter processing applied at the one of the plurality of servers based on the determined type of filter processing and the generated process subject data list; and
transmit a setting instruction including the determined content of filter processing to the one of the plurality of servers,
wherein the filter control unit updates the filter management information based on the received setting instruction,
wherein the filter distribution unit when receiving data transmitted from the plurality of sensors transmits the received data to the filter unit based on the filter management information, and
wherein each of the plurality of filter units executes the filter process with respect to the received data based on the filter management information.

3. The computer system according to claim 2 wherein the management unit is configured to:
include data management information including entries each of which corresponds to information configured to associate a type of data transmitted from the plurality of sensors and whether or not data corresponding to the type of data is discardable;
refer to the data management information when generating the process subject data list of data to which the filter processing is applied; and generate the process subject data list by extracting from the data management information entries of data permitted to be discarded, and creating a list of extracted entries.

4. The computer system according to claim 2, wherein the management unit is configured to:

include data reception status information including entries each of which associates a first reception value indicating a data type of data transmitted from the plurality of sensors, a current reception number or a current reception amount of the data corresponding to the data type, and a second reception value indicating an average value of a past reception number or an average value of a past reception amount of the data corresponding to the data type;

refer to the data reception status information when generating the process subject data list of data to which the filter processing is 5 applied; and generate the process subject data list by extracting, in a descending order of an increase of a reception number or a reception amount at a predetermined time interval, entries included at the data reception status information, and creating a list of the extracted entries.

5. The computer system according to claim 2, wherein the management unit is configured to:

include data management information including entries each of which associates a type of data transmitted from the plurality of sensors, a priority indicating an importance of data corresponding the type of data transmitted from the plurality of sensors, and a permissible delay time indicating an amount of time during which data of the data type is temporarily accumulatable at the plurality of servers; and generate the process subject data list by extracting entries, in a descending order of the importance of data or the permissible delay time, included at the data management information, and creating a list of the extracted entries.

6. The computer system according to claim 2, wherein the data collection server includes:

a resource management unit configured to monitor a load on a computer resource of each of the plurality of servers; and data reception status information including entries each of which associating a type of data transmitted from the plurality of servers, a current reception number of data corresponding to the data type, and an average value of a past reception number of data corresponding to the data type, and wherein the management unit is configured to:

refer to the data reception status information, and determine a server to which data corresponding to an entry included at the process subject data list is transferred;

refer to the resource management information, and select a server having a load smaller than a threshold on the computer resource thereof; and transmit the setting instruction to the selected server.

* * * * *